United States Patent [19]
Crane

[11] Patent Number: 5,550,692
[45] Date of Patent: Aug. 27, 1996

[54] PROXIMITY RECORDING AIR BEARING SLIDER DESIGN WITH WAIST OFFSET

[75] Inventor: Peter Crane, Richfield, Minn.

[73] Assignee: Seagate Technology, Inc., Scotts Valley, Calif.

[21] Appl. No.: 315,282

[22] Filed: Sep. 29, 1994

[51] Int. Cl.⁶ ..................................................... G11B 5/60
[52] U.S. Cl. ............................................................ 360/103
[58] Field of Search ................................................. 360/103

[56] References Cited

U.S. PATENT DOCUMENTS

| | | | |
|---|---|---|---|
| 4,894,740 | 1/1990 | Chhabra et al. | 360/103 |
| 5,062,017 | 10/1991 | Strom et al. | 360/103 |
| 5,128,821 | 7/1992 | Takeuchi et al. | 360/103 |
| 5,128,822 | 7/1992 | Chapin et al. | 360/103 |
| 5,196,973 | 3/1993 | Chapin et al. | 360/103 |
| 5,200,868 | 4/1993 | Chapin et al. | 360/103 |
| 5,210,666 | 5/1993 | Chapin et al. | 360/103 |
| 5,212,608 | 5/1993 | Yoneoka | 360/103 |
| 5,287,235 | 2/1994 | Cunningham | 360/103 |
| 5,396,387 | 3/1995 | Murray | 360/103 |

FOREIGN PATENT DOCUMENTS

| | | | |
|---|---|---|---|
| 60-101781A | 2/1984 | Japan . | |
| 61-204878A | 3/1985 | Japan . | |
| 61-283083 | 12/1986 | Japan | 360/103 |
| 6-124562 | 5/1994 | Japan | 360/103 |

*Primary Examiner*—A. J. Heinz
*Attorney, Agent, or Firm*—Westman, Champlin & Kelly

[57] ABSTRACT

An air bearing slider for supporting a magnetic transducer includes a pair of raised side rails along the sides of the air bearing surface of the slider. Each side rail has a leading edge, a trailing edge, a waist section therebetween and an inner edge extending from the leading edge to the trailing edge. A ratio of a trailing width to a waist section width is greater than or substantially equal to 1.0. The waist sections are offset in an inward direction such that the inner edges of the side rails form convex lines relative to lines extending between the leading edges and the trailing edges of each respective side rail.

21 Claims, 23 Drawing Sheets

PROXIMITY SLIDER WITH 0.8 mu" CROSS CROWN FLYING POSITION WITH ZERO ROLL ANGLE

PROXIMITY SLIDER WITH 0.8 mu" CROSS CROWN FLYING POSITION WITH 40mu-radian ROLL ANGLE

PROXIMITY RECORDING AIR BEARING SLIDER DESIGN WITH WAIST OFFSET

BACKGROUND OF THE INVENTION

The present invention relates to transducer head assemblies for rotating disc drives. More particularly, the present invention relates to an air bearing slider of a transducer head assembly.

Magnetic disc drives are used to store magnetically encoded information. As the magnetic disc spins, a transducing head "flies" over the surface of the disc. The transducing head is used to sense magnetic fields from the disc surface during readback of information, and to generate magnetic fields which are impressed onto the surface of the disc during writing of information. As the disc spins, the transducing head is supported by an "air bearing" which is formed between the disc surface and an air bearing slider of the transducer head assembly. The slider body has aerodynamic properties which provide a lifting force.

It is known that improved magnetic interaction between the disc surface and the transducing head can be achieved by reducing the spacing between the head slider and the disc surface. However, as the spacing between slider and disc is reduced, it becomes critical that the fly height be accurately maintained. If the slider should dip slightly, it will touch the surface of the disc and potentially damage the surface. This is particularly difficult because sliders tend to have different fly heights at the inner diameter (ID) of the disc than at the outer diameter (OD) of the disc.

SUMMARY OF THE INVENTION

The present invention provides an air bearing slider which reduces the effect of slider position on flying height over a rotating disc. An air bearing disc head slider for supporting a transducer head proximate a rotating magnetic disc includes a slider body. The slider body has a surface with a leading edge, a trailing edge and first and second side edges. First and second raised side rails lie along the first and second edges, respectively. Each side rail has a leading edge, a trailing edge, a waist section therebetween, and an inner edge extending from the leading edge to the trailing edge. An hourglass ratio of a trailing edge width to a waist section width is greater than or substantially equal to 1.0. The waist sections of the first and second raised side rails are offset in an inward direction such that the inner edges form convex lines relative to lines which extend between the leading and trailing edges of each respective side rail.

DETAILED DESCRIPTION OF THE PREFERRED EMBODIMENTS

In magnetic recording disc systems, it is desirable to keep the recording head in close proximity to the disc. The limiting case of having intermittent contact with the disc, or "Proximity Recording", is the subject of this invention.

Figure 1:
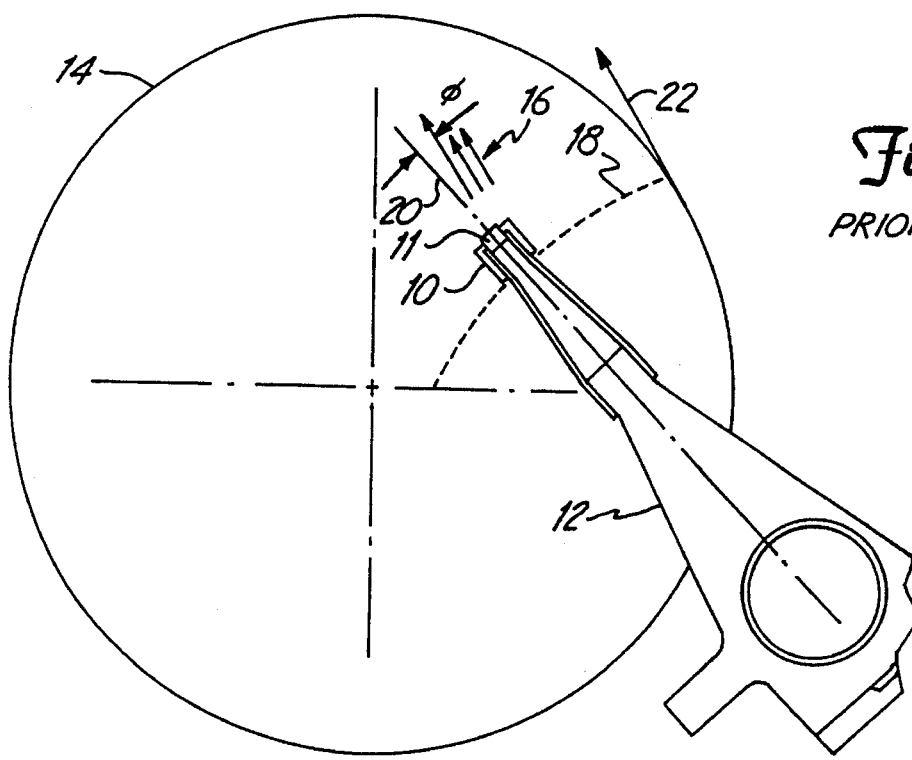
FIG. 1 is a top plan view of a disc 14 in operation with a prior art air bearing slider.

Transducer head assemblies that "fly" relative to a rotating disc are used extensively in rotating disc drives. The assemblies include an air bearing slider for carrying a magnetic transducer proximate the rotating disc. FIG. 1 illustrates a prior art slider 10 supported by a gimbal 11 over a disc 14. Gimbal 11 is secured to an arm 12. Arm 12 positions slider 10 over individual data tracks on disc 14 (not shown) along arc 18. As disc 14 rotates, it generates wind or air flow in the direction shown by arrows 16 (wind 16). Wind 16 is approximately parallel to the disc's tangential velocity, indicated by arrow 22. The wind cooperates with slider 10 to provide lift which allows the slider to fly above disc 14.

Gimbal 11 is a resilient spring that allows slider 10 to follow the topography of disc 14. Gimbal 11 includes a dimple (not shown) that is in point contact with arm 12. The dimple provides a pivot about which slider 10 can pitch and roll while following the topography of disc 14.

The elements described to this point may be conventional in design and are described as shown in FIGS. 1 and 2A through 2C to facilitate an understanding of the present invention. Throughout the figures, elements of the same design are designated by identical reference numerals.

Figure 2A:
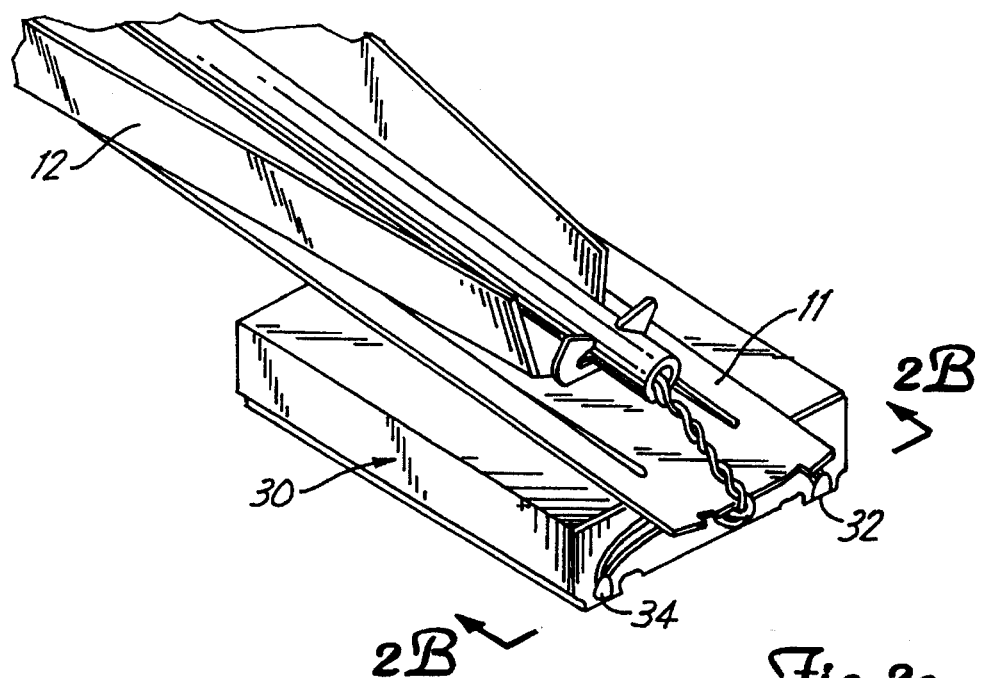
FIG. 2A is a perspective view of the prior art slider of FIG. 1.

FIG. 2A is a perspective view of a head-gimbal assembly having a conventional catamaran slider 30. Slider 30 and gimbal 11 are supported by arm 12. Rails 32 and 34, positioned along edges of slider 30, form air bearing surfaces on which slider 30 flies, in a known manner.

Figure 2B:
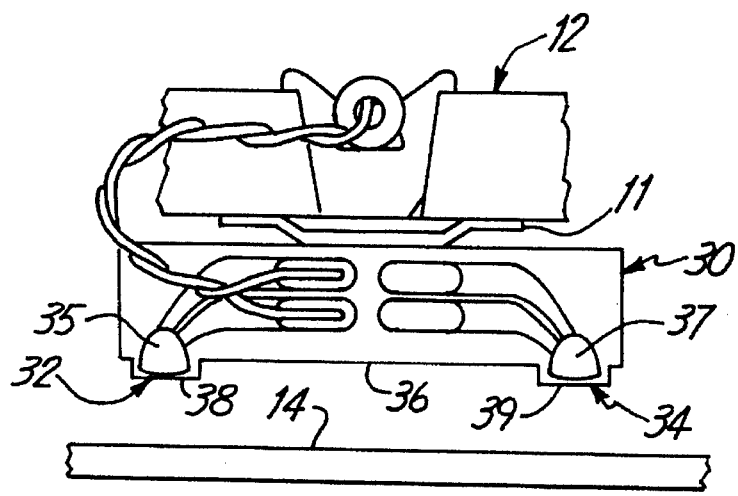
FIG. 2B is a plan view of a trailing edge of the prior slider.

FIG. 2B is an end view of slider 30 as seen from line 2B–2B of FIG. 2A. Arm 12 and gimbal 11 support slider 30 above disc 14. Slider 30 includes rails 32 and 34 which carry transducers 35 and 37. Rails 32 and 34 include air bearing surfaces 38 and 39 which provide lift to slider 30, as described more fully below.

Flying height is viewed as one of the most critical parameters of non-contact recording. As the average flying height of slider 30 decreases, transducers 35 and 37 achieve greater resolution between individual data bit locations on disc 14. Therefore, it is desirable to have transducers 35 and 37 fly as close to disc 14 as possible.

Figure 2C:
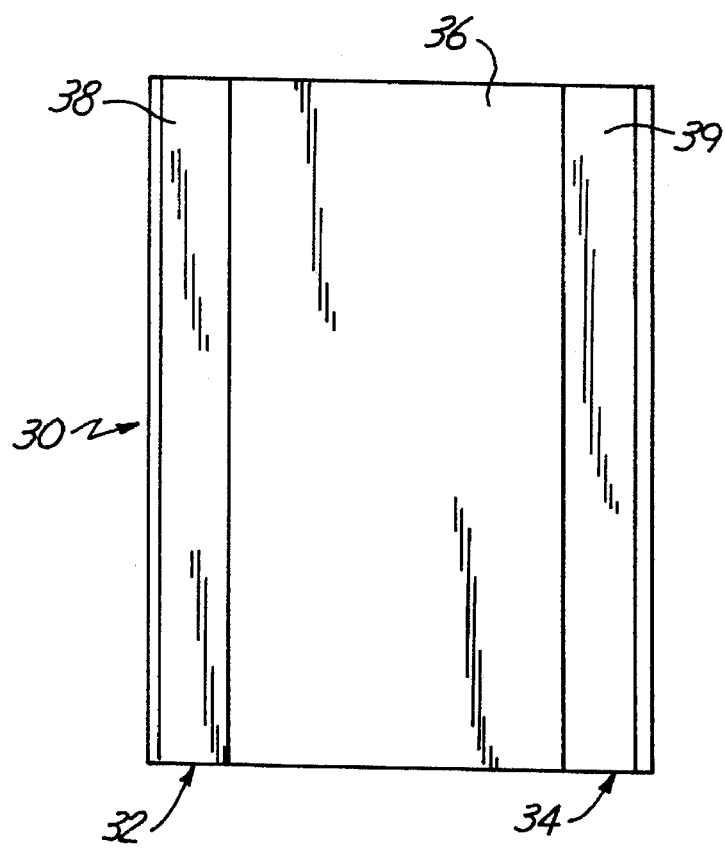
FIG. 2C is a bottom plan view of a bottom of the prior art slider.

FIG. 2C is a bottom plan view of slider 30. Rails 32 and 34 are positioned along edges of slider 30 and are disposed about a recessed area 36 to form air bearing surfaces 38 and 39. As disc 14 rotates, the disc drags air (wind 16) under the slider 30 and along air bearing surfaces 38 and 39. Under air bearing surfaces 38 and 39, the air flow component due to the drag of disc 14 is called "Couette flow." As Couette flow passes beneath rails 32 and 34, the skin friction on air bearing surfaces 38 and 39 causes the air pressure between the disc 14 and the air bearing surfaces to increase, which provides lift causing slider 30 to fly above the disc surface.

The flying height is preferably uniform regardless of variable flying conditions, such as tangential velocity variation from inside to outside tracks, lateral slider movement during a seek, and varying skew angles ø. Catamaran sliders provide just enough air bearing surface area to fly at a proper height above the disc surface. For example, without rails 32 and 34, the air bearing surface area would be too large. Consequently, slider 30 would fly too far from the disc surface at a height adversely affecting resolution.

As the disc rotates, any intermittent contact with disc asperities must not result in excessive wear of the disc. To this end, a compliant air bearing design may be used. Contacts with asperities in the disc surface will cause relatively large air bearing deflections. To make a compliant air bearing, the present invention does not use a Negative Pressure Air Bearing (NPAB) concept. This concept is described in U.S. Pat. No. 5,128,822, entitled "Configuration for Negative Pressure Air Bearing Sliders," issued Jul. 7, 1992, which is commonly assigned with the present application. NPAB designs have higher air bearing stiffness than non-NPAB designs, and proximity recording requires reduced air bearing stiffness.

To minimize the probability of disc contact, a trimaran design may be used. This design has a recording head mounted at the center of the trailing edge. A small air bearing pad surrounds the head, such that the pole tips of the head core are properly lapped to conform to the air bearing surface. The air bearing rails are formed as outriggers along the sides of the slider, and are truncated just short of the trailing edge. The flying pitch angle of the slider results in the outrigger flying height being substantially higher than the head flying height. This reduces the probability that the outriggers will contact disc asperities while flying. Trimaran designs are known in the art, such as the design of U.S. Pat. No. 4,894,740.

Figure 3A:
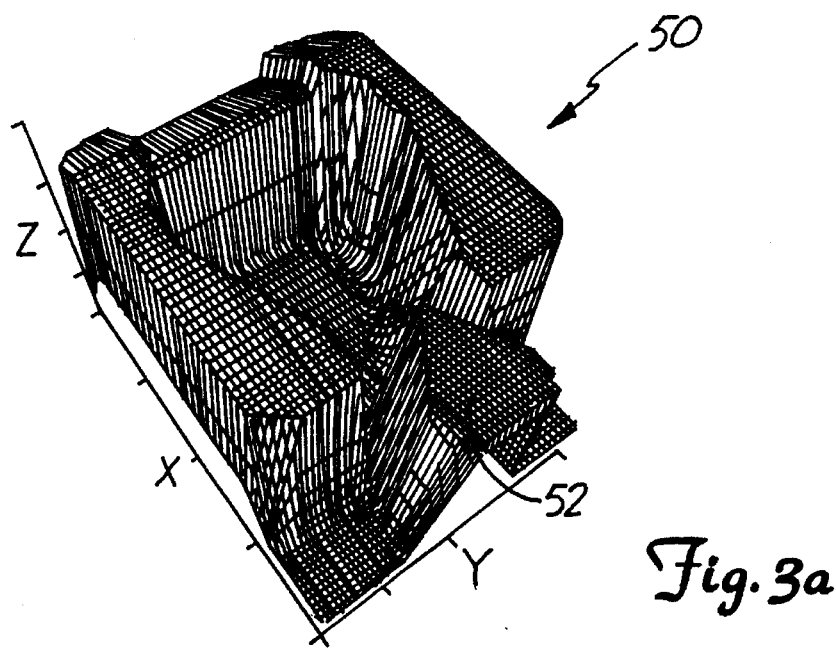
FIGS. 3A and 3B show slider designs having a large central pad and a narrow central pad, respectively.
Figure 3B:
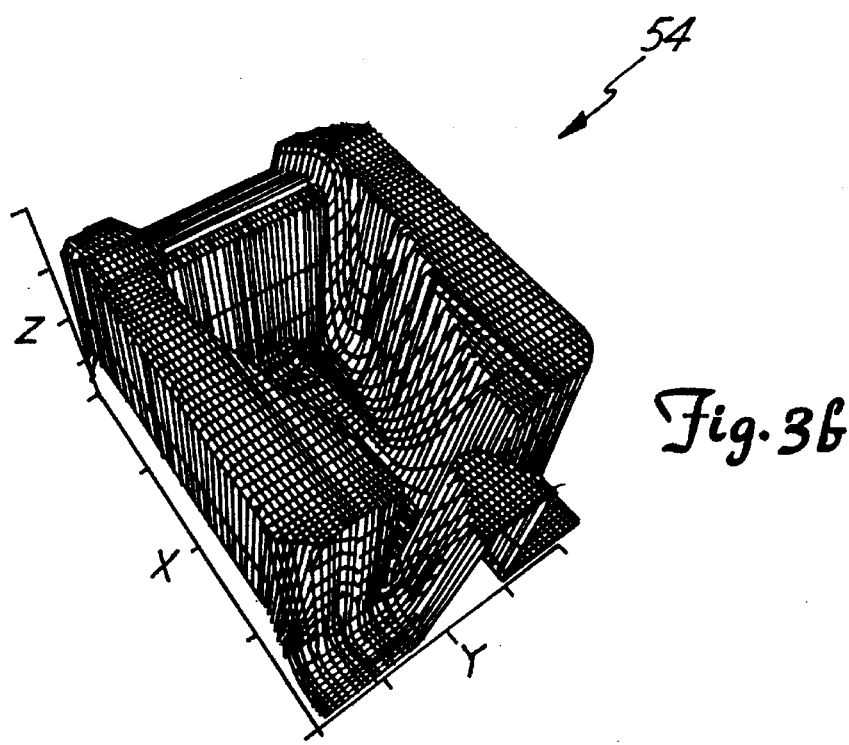

FIG. 3a shows NPAB center rail design 50 with large head mounting pad 52. FIG. 3b shows an NPAB center rail design 54 with a small pad 56. The relieved leading edge is shown in U.S. Pat. No. 5,210,666, commonly assigned with the present application, and the hourglass shape is discussed below.

Figure 4A:
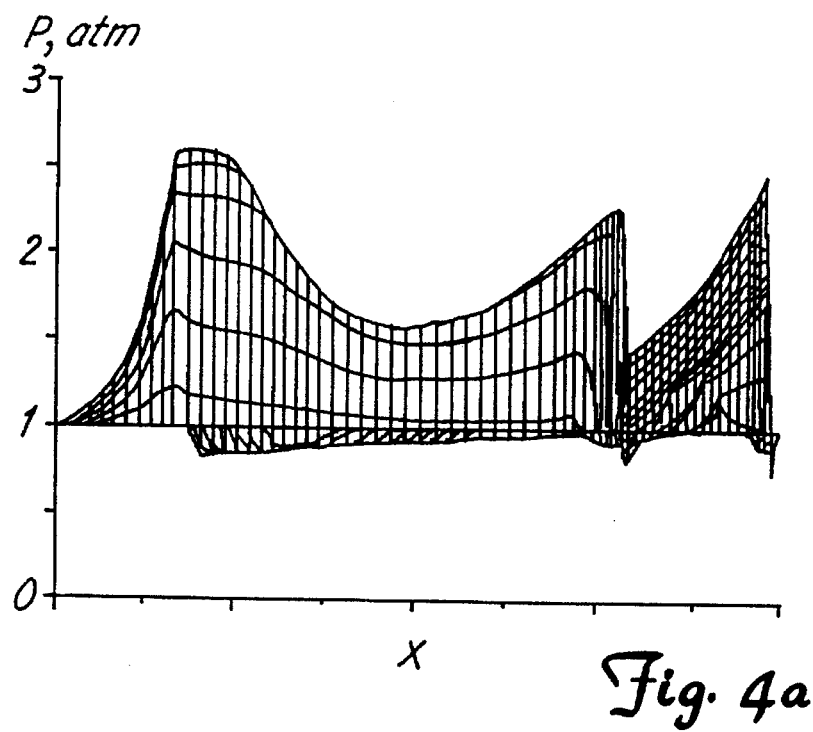
FIGS. 4A and 4B show pressure build up along the X axis of the prior art slider of FIG. 3A.
Figure 4B:
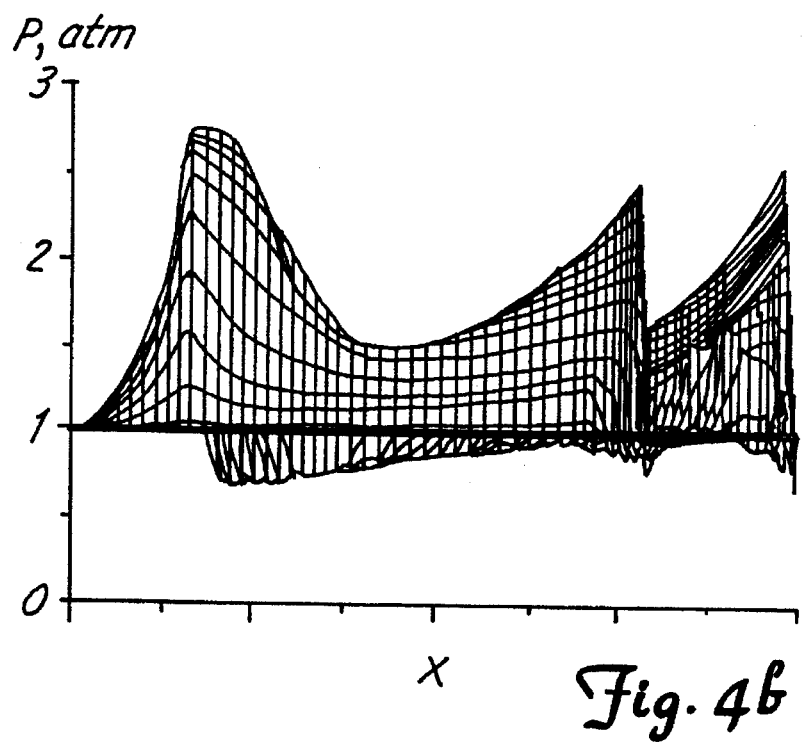
Figure 5A:
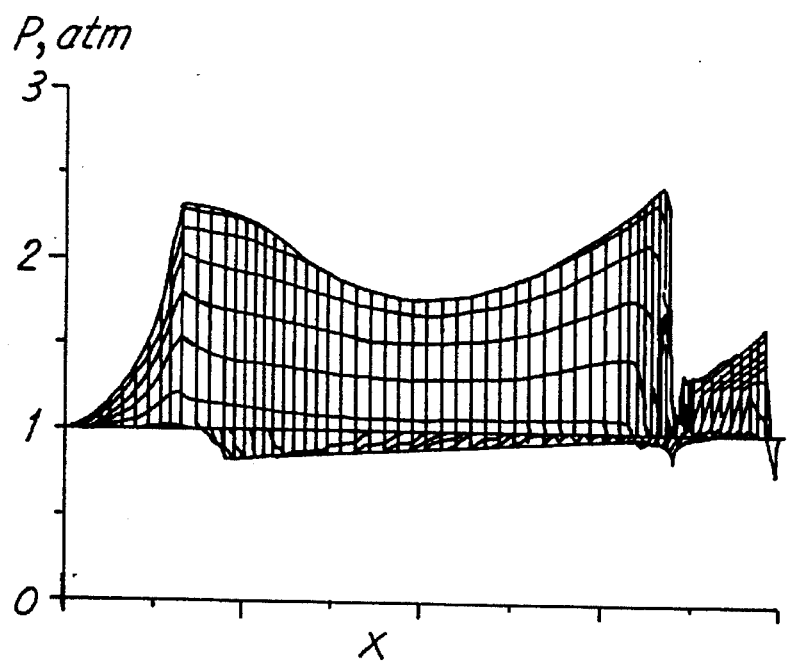
FIGS. 5A and 5B show pressure build up along the X axis of the prior art slider of FIG. 3B.
Figure 5B:
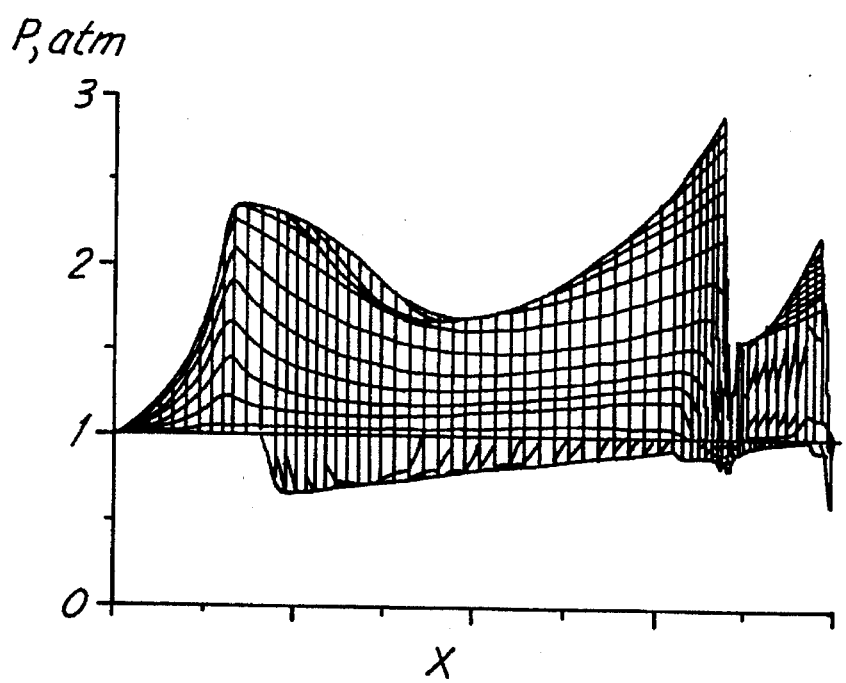

The benefit of a small head mounting pad is shown in FIGS. 4 through 6. FIG. 4b shows that the large pad 50 accumulates 2.5 atmospheres of lubricant (air) pressure at the outer diameter (OD) of disc 14. The high pressure buildup on large pad 52 tends to raise the head away from disc 14 at the drive OD. FIG. 4a shows air pressure when design 50 is at the inner diameter (ID). FIG. 5b shows that small pad 56 accumulates 2.1 atmospheres of pressure at the OD. The smaller pressure buildup on the small pad area allows the head to fly closer to disc 14 at the drive OD. FIG. 5a shows air pressure for design 54 at the drive ID.

Figure 6A:
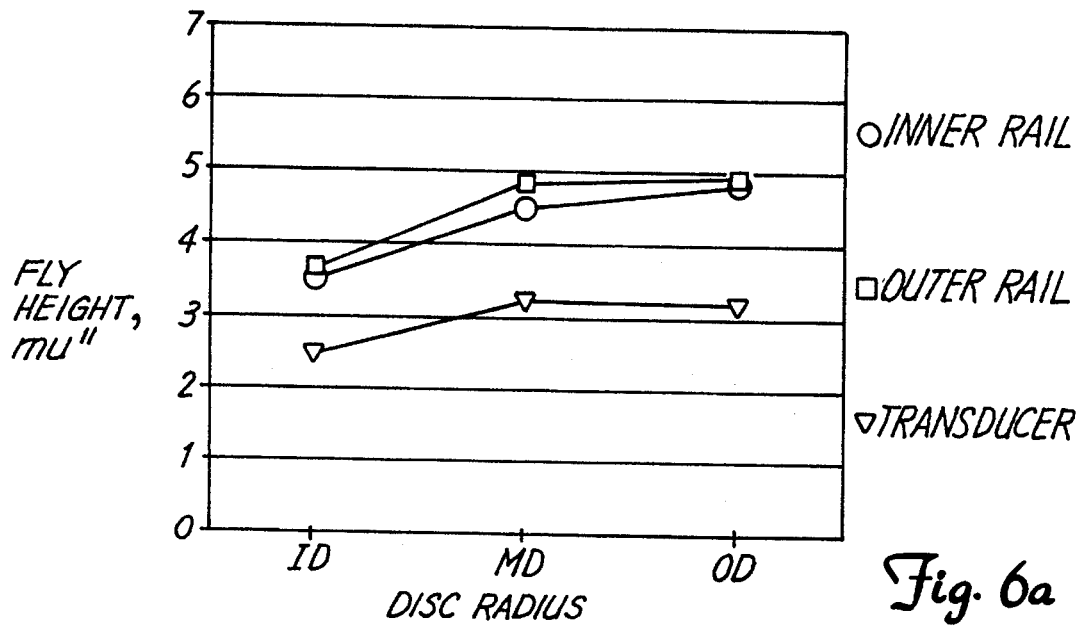
FIGS. 6A and 6B shows fly height versus disc radius for large center pad slider and small center pad slider, respectively.
Figure 6B:
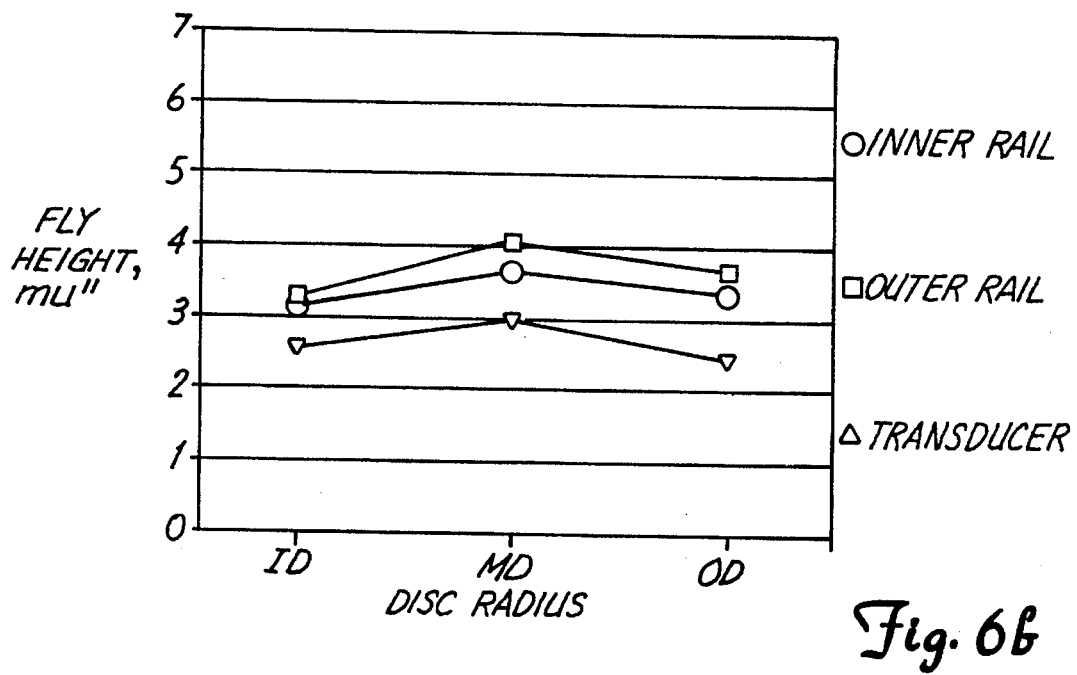

For proximity recording, it is necessary to fly the head close to disc 14 at all diameters. FIGS. 6a and 6b show that this is more easily accomplished with a small head mounting pad. Large pad 52 flies 0.7 μinches higher at the OD than at the ID. Small pad 56 flies at the same clearance at ID and OD. This is due to the reduced pressure buildup on the smaller surface area of the smaller head mounting pad.

Figure 7:
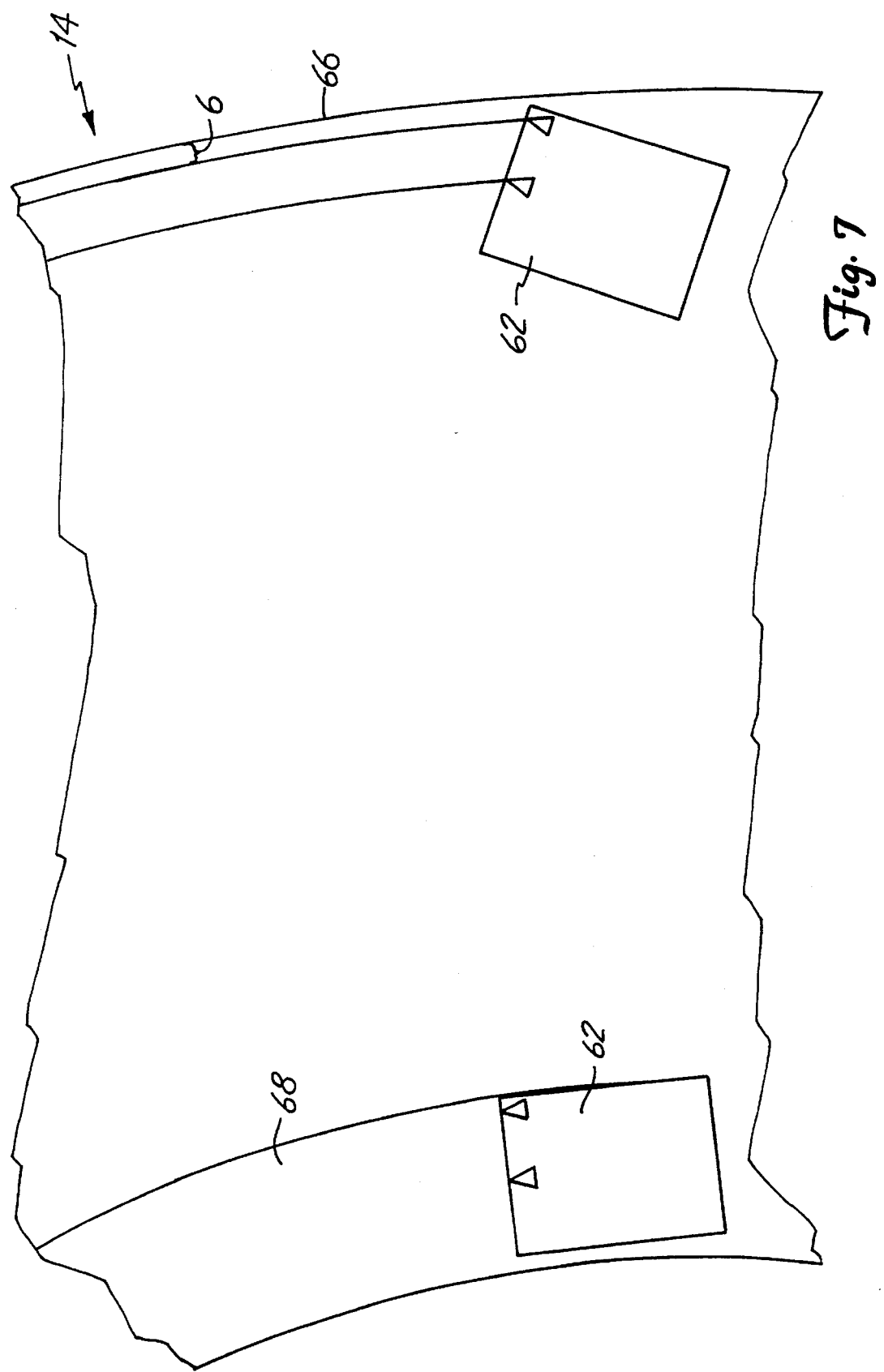
FIG. 7 shows slider position relative to a magnetic storage disc.

A disadvantage of trimaran designs is that high capacity recording tracks are lost at the disc OD 66. The mechanism of this data storage capacity loss is shown in FIG. 7. Disc 14 typically has a chamfered edge 60 at OD 66 which is difficult to polish to the required smoothness for flying. A trimaran design 62 must stop short of swinging the outer corner of the slider over chamfer 60, or else the corner will contact non-polished regions near chamfer 60 with high asperity heights. Therefore, trimaran 62 loses one-half the pole spacing of a side rail design at the outer radius 66. There are no tracks lost at the inner diameter 68, since the head is usually swung out just enough to clear the landing zone. Thus, the recording tracks start adjacent to the landing zone for both trimaran and side rail head locations.

Assuming constant areal bit density from ID to OD, the data storage capacity loss from side rail head mounting to center rail head mounting is tabulated below. The capacity loss increases with the smaller form factor drives, but decreases with the smaller form factor sliders.

TABLE 1

STORAGE CAPACITY LOSS OF
CENTER RAIL vs SIDE RAIL TRANSDUCER
(CONSTANT AREAL DENSITY)

| Disc Size | 50% Form Factor Slider | 30% Form Factor Slider |
|---|---|---|
| 3.5 inches | 3.8 | 2 |
| 2.5 inches | 5.3 | 2.8 |
| 1.8 inches | 7.3 | 3.8 |
| 1.3 inches | 10 | 5.3 |
| 1 inch | 13 | 6.8 |

Figure 8:
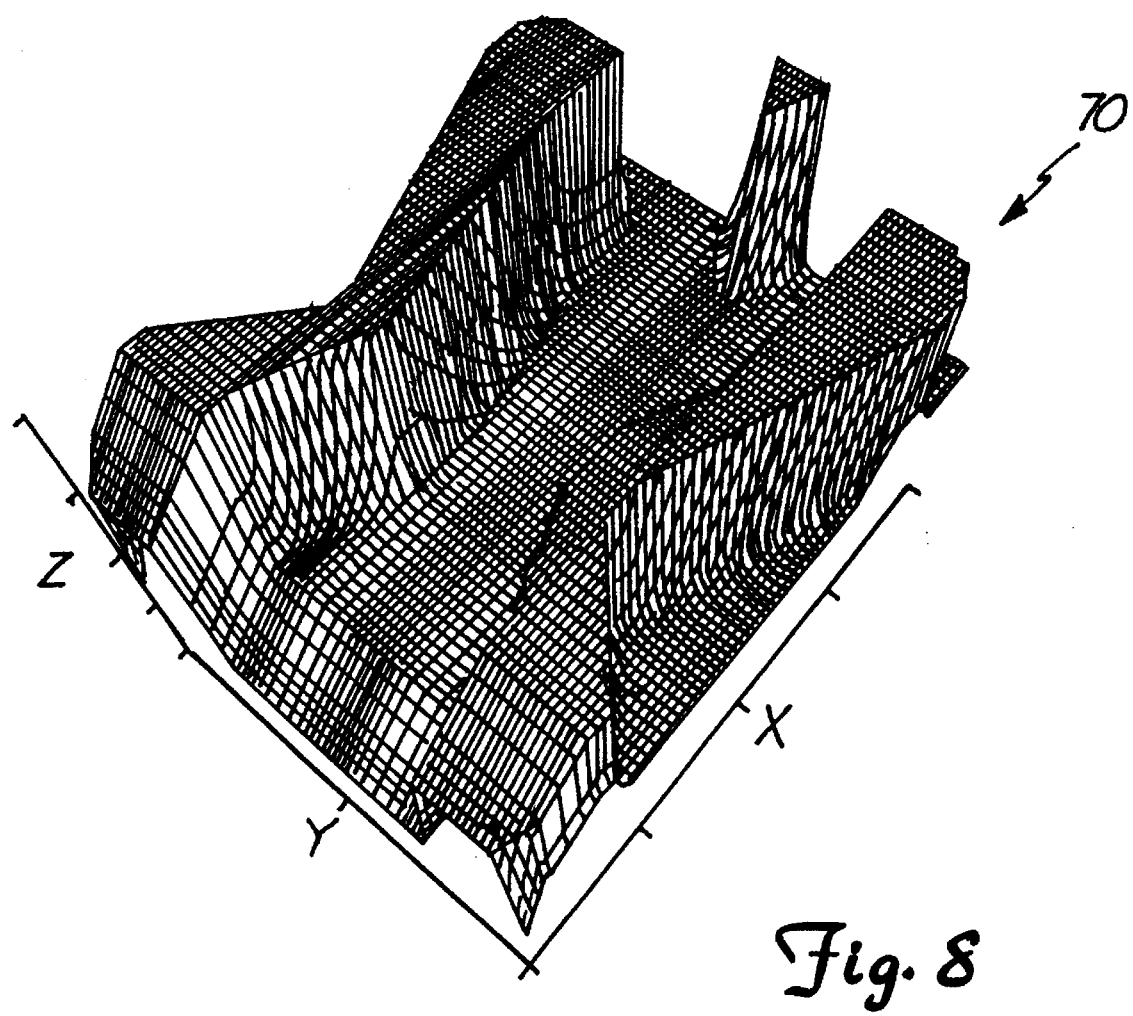
FIG. 8 graphically shows the slider body surface of a slider in accordance with one embodiment of the invention.
Figure 9:
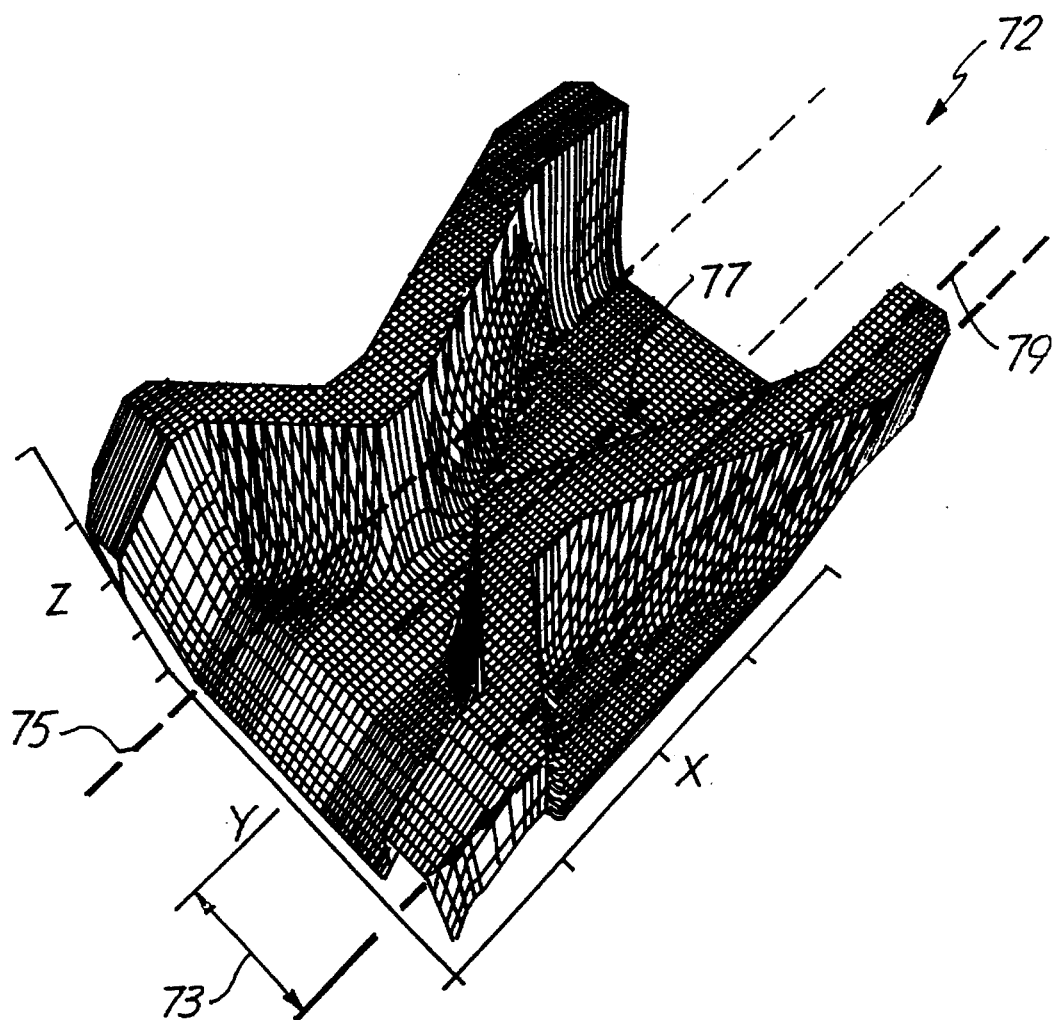
FIG. 9 graphically shows the slider body surface of a slider in accordance with another embodiment of the invention.

One aspect of the invention includes the following Proximity Recording Air Bearing (PRAB) designs:

1) Non-NPAB with Center Rail Head 70 as in the example of FIG. 8 having a waist offset of 12 mil.
2) Non-NPAB with Side Rail Head Mounting 72 as in the example of FIG. 9 having a waist offset of 15 mil.

In order to fly the head at a nearly constant flying height from the disc ID to the disc OD, hourglass rails may be used. Hourglass rails reduce the fly height sensitivity to the varying skew angle between the slider and the disc sliding velocity. Hourglass rails are disclosed in U.S. Pat. Nos. 5,062,017 and 5,128,821 and Japanese Patents No. 60-101781 and No. 61-204878.

Typical hourglass rails have a wide leading edge, a narrow waist section near the middle of the slider length, and a wide trailing end. The air bearing flying height vs. skew sensitivity is determined by the "hourglass ratio" (HR), which is the ratio of the trailing end width to the waist width. The HR may vary without limit above 1.0, however, typical sliders having an HR in the range of 1.0 to 4.0. Hourglass rails with HR=1.0 have uniform rail width at the ends and the waist section of the rails.

Hourglass rail sliders may also have a waist offset 73, where the waist section is set inward toward a longitudinal center axis from a line connecting the leading and trailing ends of the rail at their outermost edges. One aspect of this invention is that the waist offset is made very large, such that the inner edge of the rail forms a convex shape relative to the outer edge of the slider. The large waist offset is used to maintain the slider roll angle near zero at the varying skew angles traversed from the disc ID to the disc OD. The waist offset may also be referenced with respect to rail centers 77 and 79, where rail center 77 at the waist section is offset from rail center 79 at the leading and trailing ends in a direction toward longitudinal center axis 75.

Figure 10:
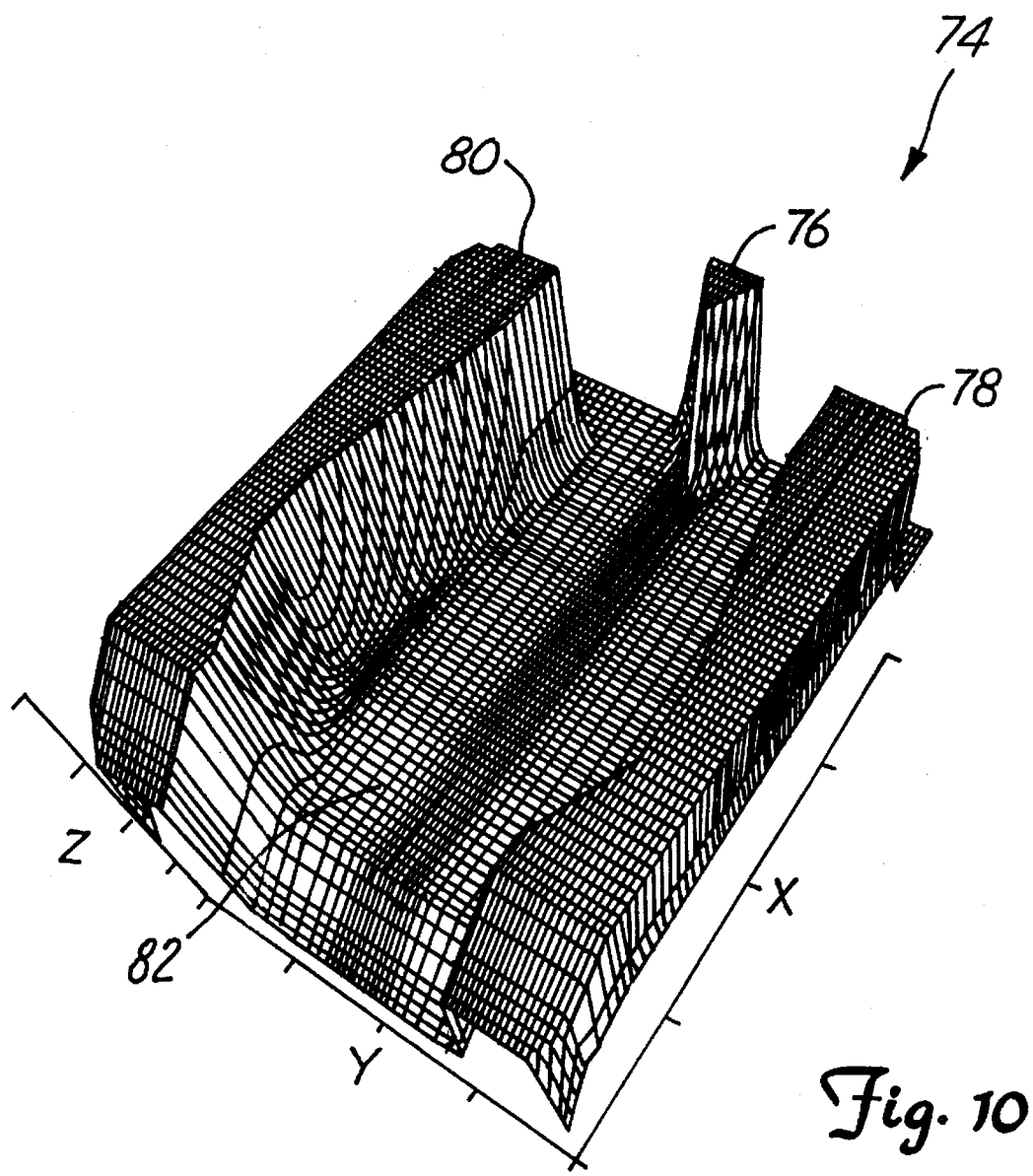
FIG. 10 is a graphical view of the slider body surface of a slider having a shallow cavity.

FIG. 10 shows a PRAB (Proximity Recording Air Bearing) 74 with a waist offset of zero. The design 74 of FIG. 10 is similar to the design 70 of FIG. 8, except that there is no waist offset in FIG. 10. Both sliders 70 and 74 in FIGS. 8 and 10 have hourglass ratios of 2.0.

Figure 11:
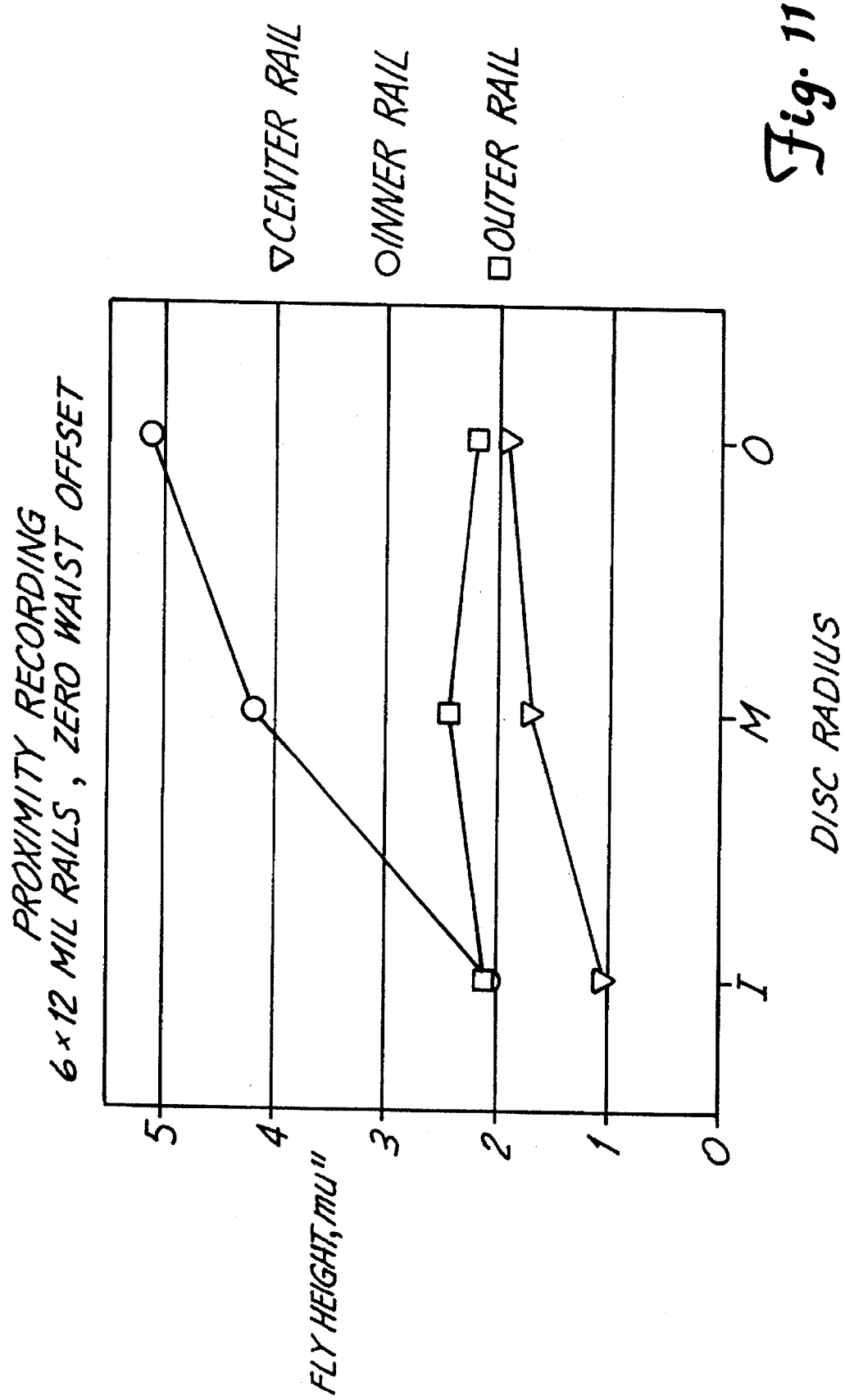
FIG. 11 is a graph of fly height versus disc radius for a proximity recording slider in accordance with one embodiment of the invention.

For the zero waist offset design 74 of FIG. 10, the flying height of the recording head 76 and the outriggers 78 and 80 in an example 2.5 inch drive is shown in FIG. 11. Slider 74 has a large roll angle at the disc OD, such that the outer rail fly height approaches the head fly height. The large slider roll at the OD is undesirable, as the probability of disc contact with the outer rail is increased at the drive OD.

Figure 12A:
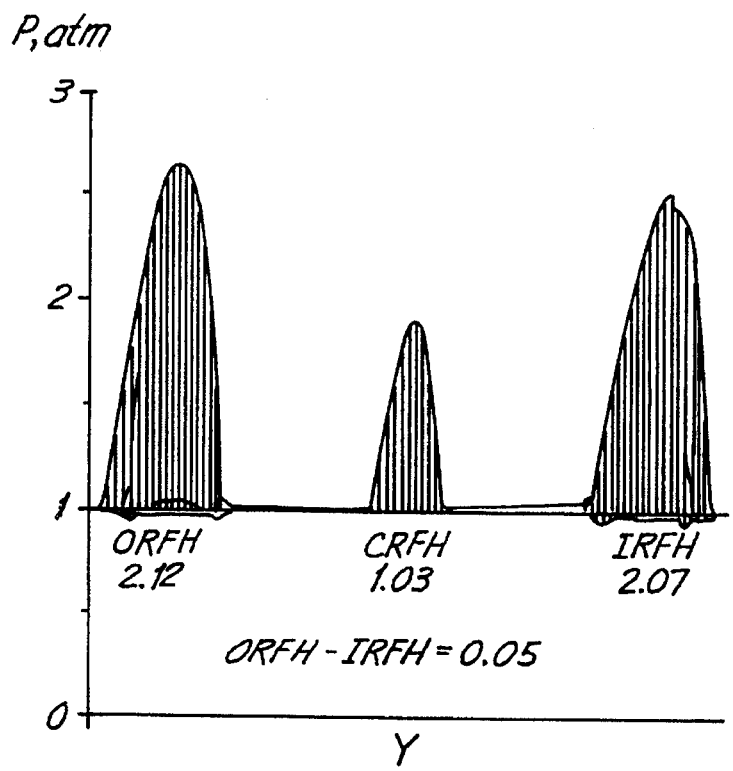
FIGS. 12A and 12B show pressure versus Y axis of a slider at the drive inner diameter and outer diameter, respectively.
Figure 12B:
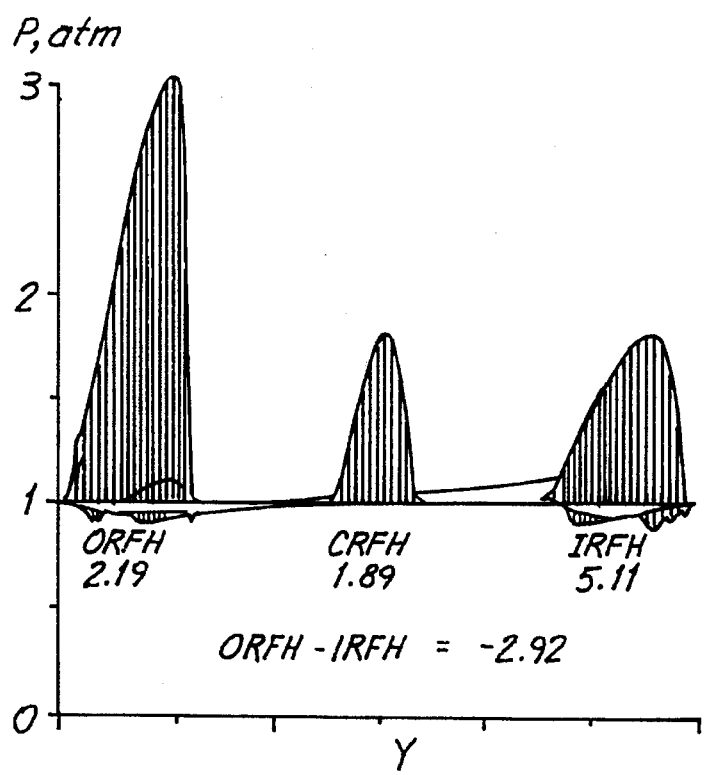

Slider 74 of FIG. 10 has a shallow cavity 82 etched 5.0 microns deep between rails 78 and 80. FIGS. 12a and 12b show the pressurization of slider 74 at the drive ID and OD, respectively. At the ID skew angle of 8.8 degrees, disc 14 sweeps air out the trailing end of cavity 82, and the pressurization is mainly due to the air bearing surfaces. At the OD skew angle of 22.4 degrees, disc 14 sweeps air across cavity 82 from the outer rail to the inner rail. The air builds up pressure as it is swept across cavity 82 due to the viscous drag on the shallow cavity surface. Thus, pressure accumulates on this shallow cavity at the disc OD, this pressure increasing as the inner rail is approached. The inner rail is therefore pressurized more than the outer rail, and tends to fly higher than the outer rail and roll slider 74 at the disc OD.

Figure 13A:
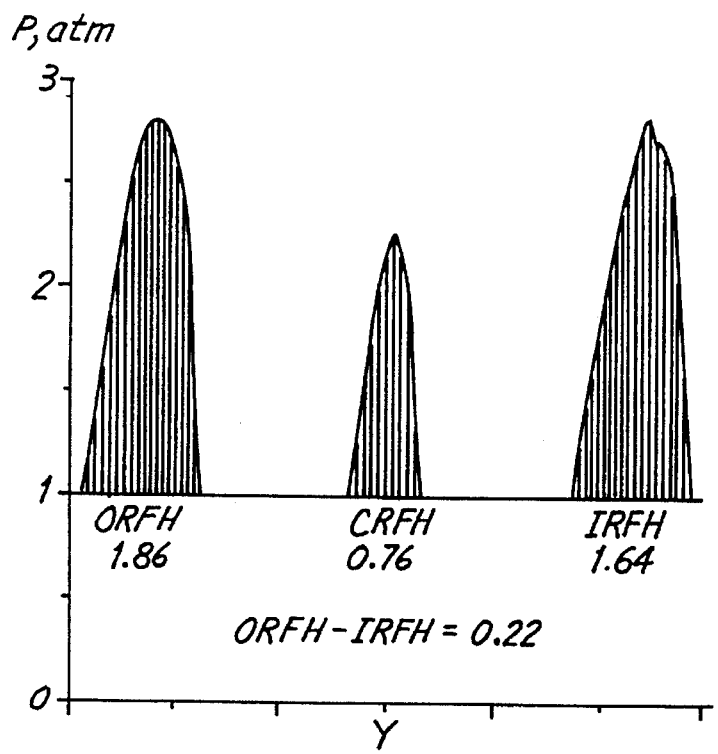
FIGS. 13A and 13B show pressure versus Y axis of a slider having a 15 micron cavity depth at the inner diameter and outer diameter, respectively.
Figure 13B:
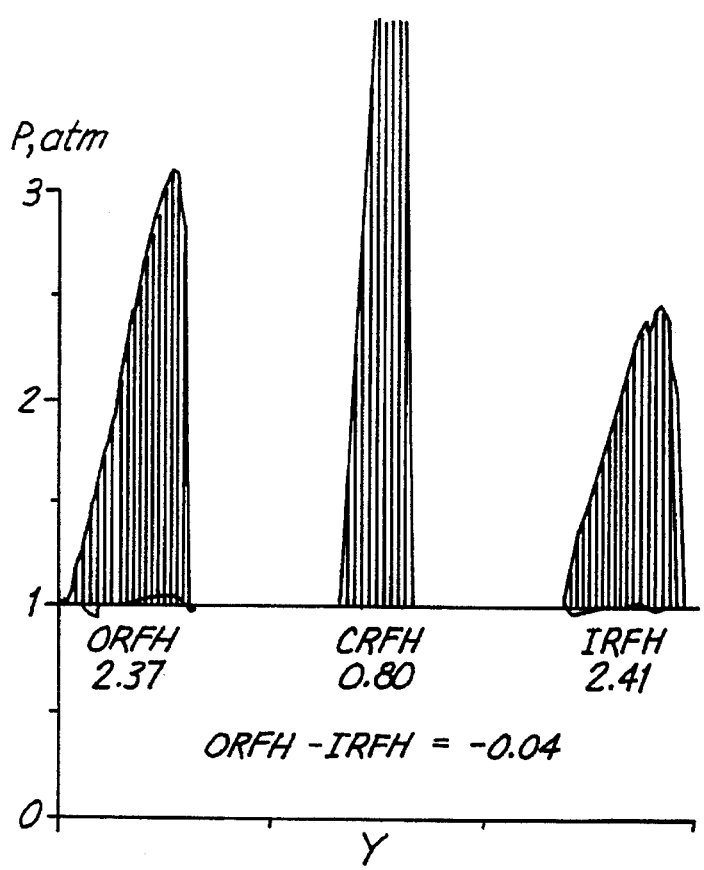
Figure 14:
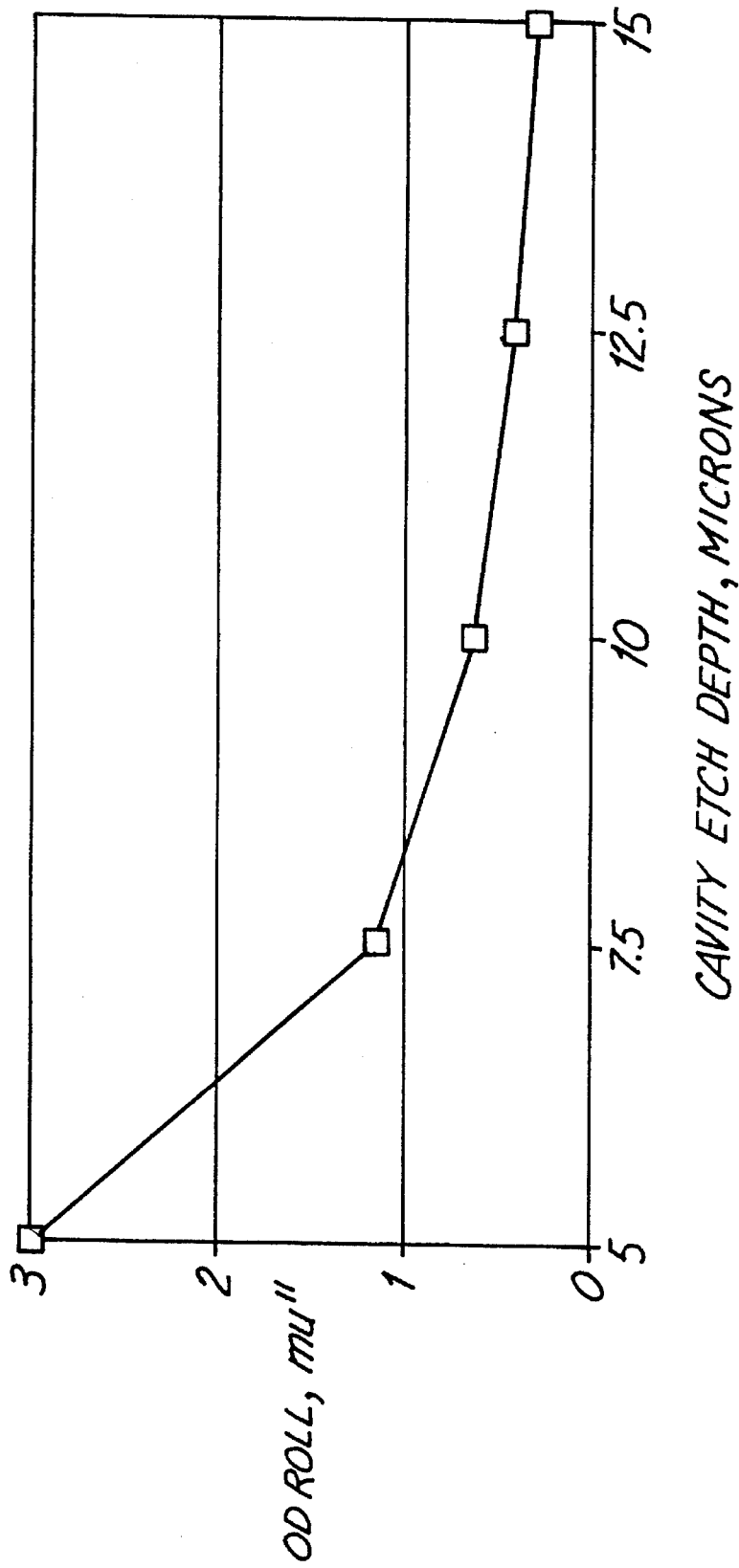
FIG. 14 is a graph of outer diameter roll versus cavity etch depth for an air bearing slider.

Prior art sliders used cavity etch depths as high as 17 microns to control the OD roll. There is less pressure buildup on a deep skewed cavity, but it takes longer to mill the sliders, and more capital equipment is required for a given production throughput. FIGS. 13a and 13b show the pressurization of the slider of FIG. 10 with a 15 micron cavity etch depth at the inner and outer diameters, respectively. There is no cavity pressure buildup on the deep cavity as there was on the shallow cavity of FIGS. 12a and 12b. Therefore, there is less OD roll induced by a deep cavity. FIG. 14 shows that the OD roll of the slider 74 of FIG. 10 can be made acceptably small with a cavity etch depth of 10 microns.

Figure 15:
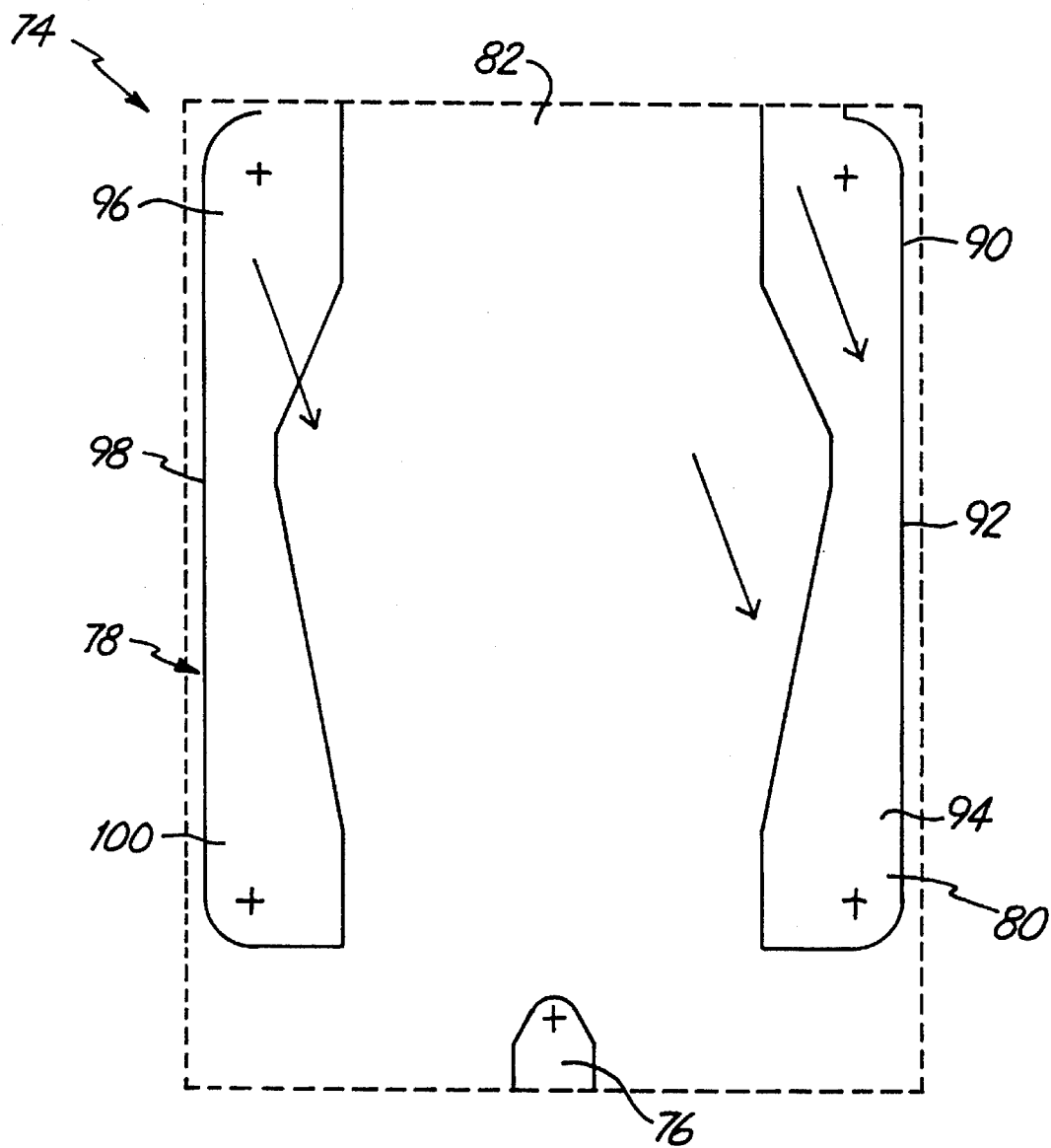
FIG. 15 shows the effects of rail shape on pressurization of a slider at a 20 degree skew angle.

In order to maintain high production throughput, it is desirable to keep the cavity etch depth at 5 microns. To this end, the effect of waist offset on slider roll was investigated. FIG. 15 shows the effects of rail shape on pressurization at 20 degrees skew of the zero waist offset slider 74 of FIG. 10. The high pressure at the inner rail 80 leading taper 90 is swept onto the waist section 92 and trailing pad 94 of the inner rail 80. The high pressure at the outer rail leading taper 96 is swept away from the waist 98 and trailing pad 100 of the outer rail 78. Therefore, at the 20 degrees skew angle typical of the drive OD, inner rail 80 is pressurized more effectively than outer rail 78 by the zero waist offset rail shape. Therefore, the zero waist offset rail shape contributes to the large OD roll induced by the shallow cavity etch depth.

Figure 16:
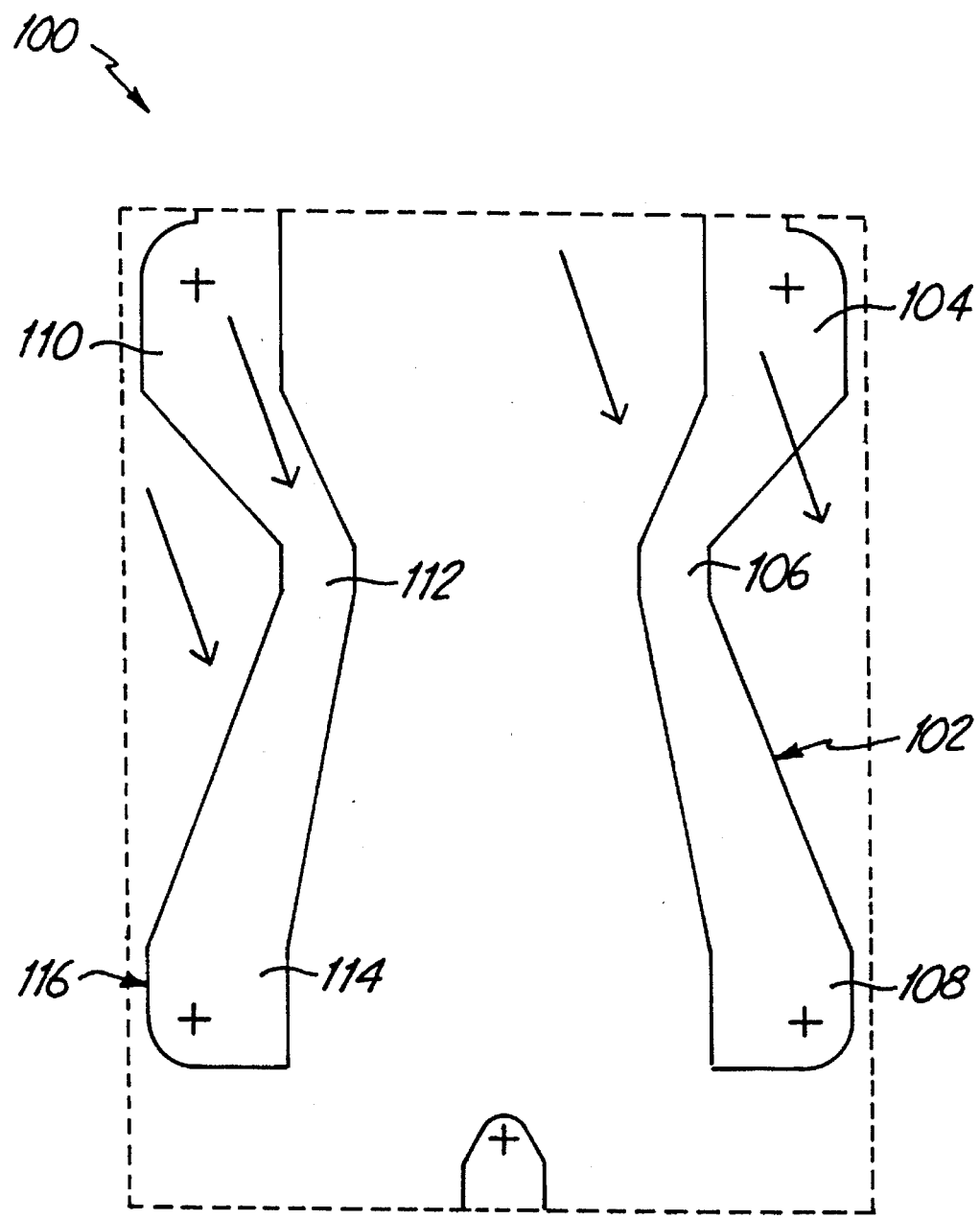
FIG. 16 shows the effects of rail shape on pressurization at a 20 degree skew angle of another slider.
Figure 17A:
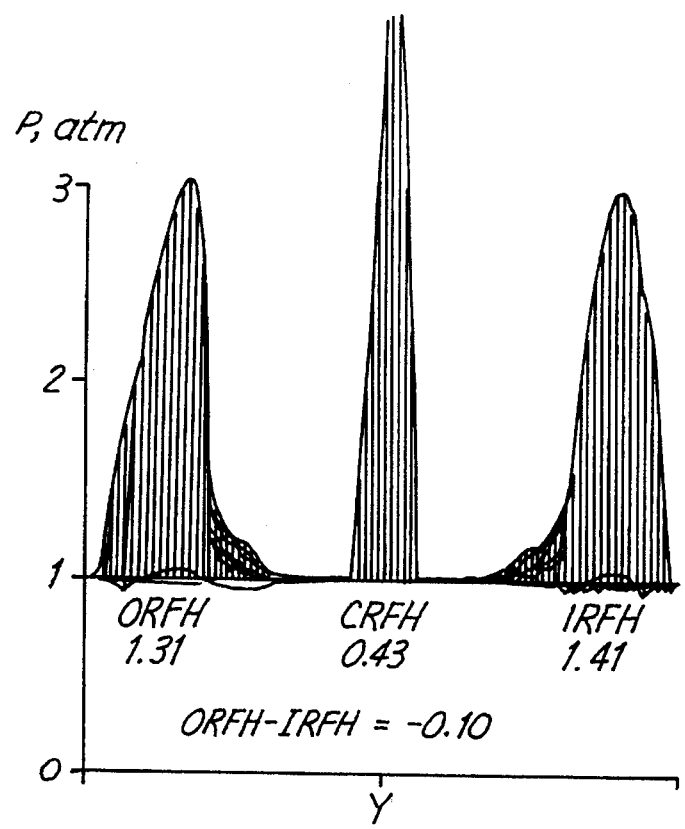
FIG. 17A and 17B show pressure versus Y axis position along a slider at the drive inner diameter and outer diameter, respectively.
Figure 17B:
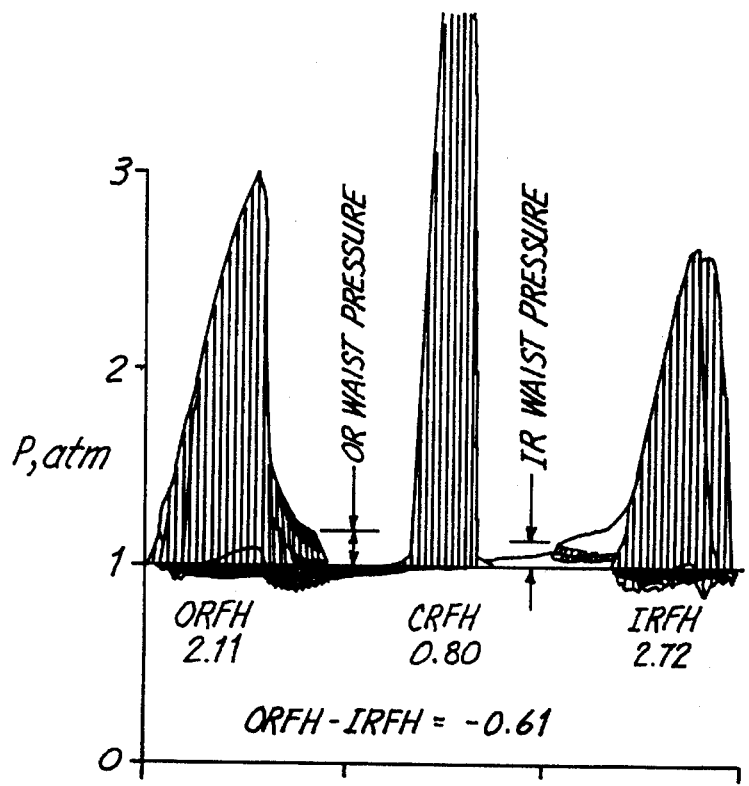

FIG. 16 shows the effects of rail shape on pressurization at 20 degrees skew of high waist offset slider 100, having a cavity etch depth of 5 microns. The high pressure at the inner rail leading taper 104 is swept away from the waist area 106 and trailing pad 108 of the inner rail 102. The high pressure at the outer rail leading taper 110 is swept onto the waist area 112 and trailing pad 114 of the outer rail 116. Therefore, at the drive OD, the inner rail 102 is not as effectively pressurized as the outer rail 116 by the high waist offset rail shape of the current invention. The high waist offset rail shape then counteracts the OD roll induced by the shallow cavity etch depth. FIG. 17a shows the pressure buildup on slider 100 at the inner diameter and FIG. 17b is at the outer drive diameter. FIGS. 17a and 17b show that although the cavity pressure buildup is still present on the high waist offset design, the efficient pressurization of outer rail waist section 112 allows slider 100 to fly with much less roll than slider 74 of FIG. 12.

Figure 18:
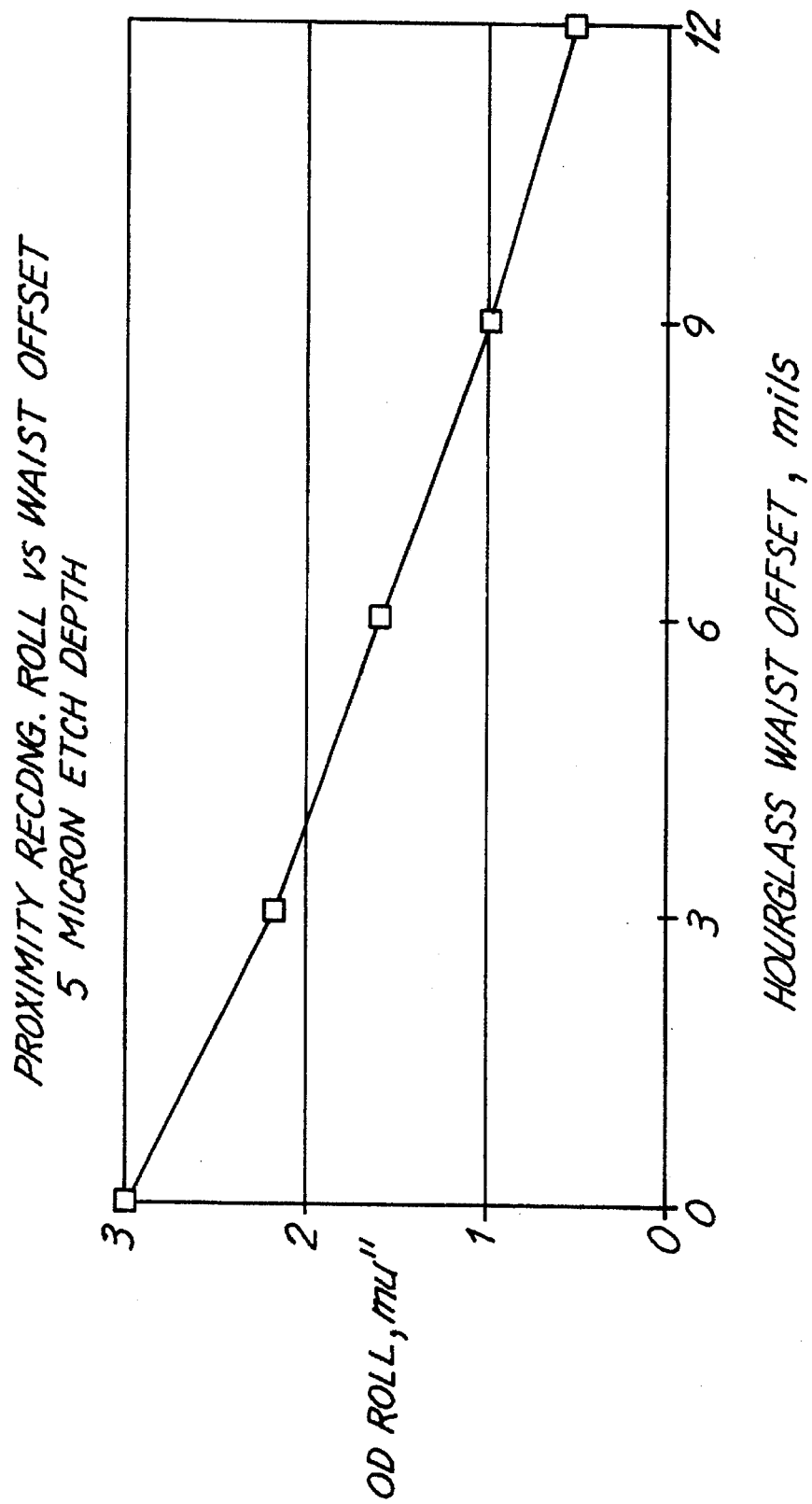
FIG. 18 is a graph of outer diameter roll versus waist offset.
Figure 19:
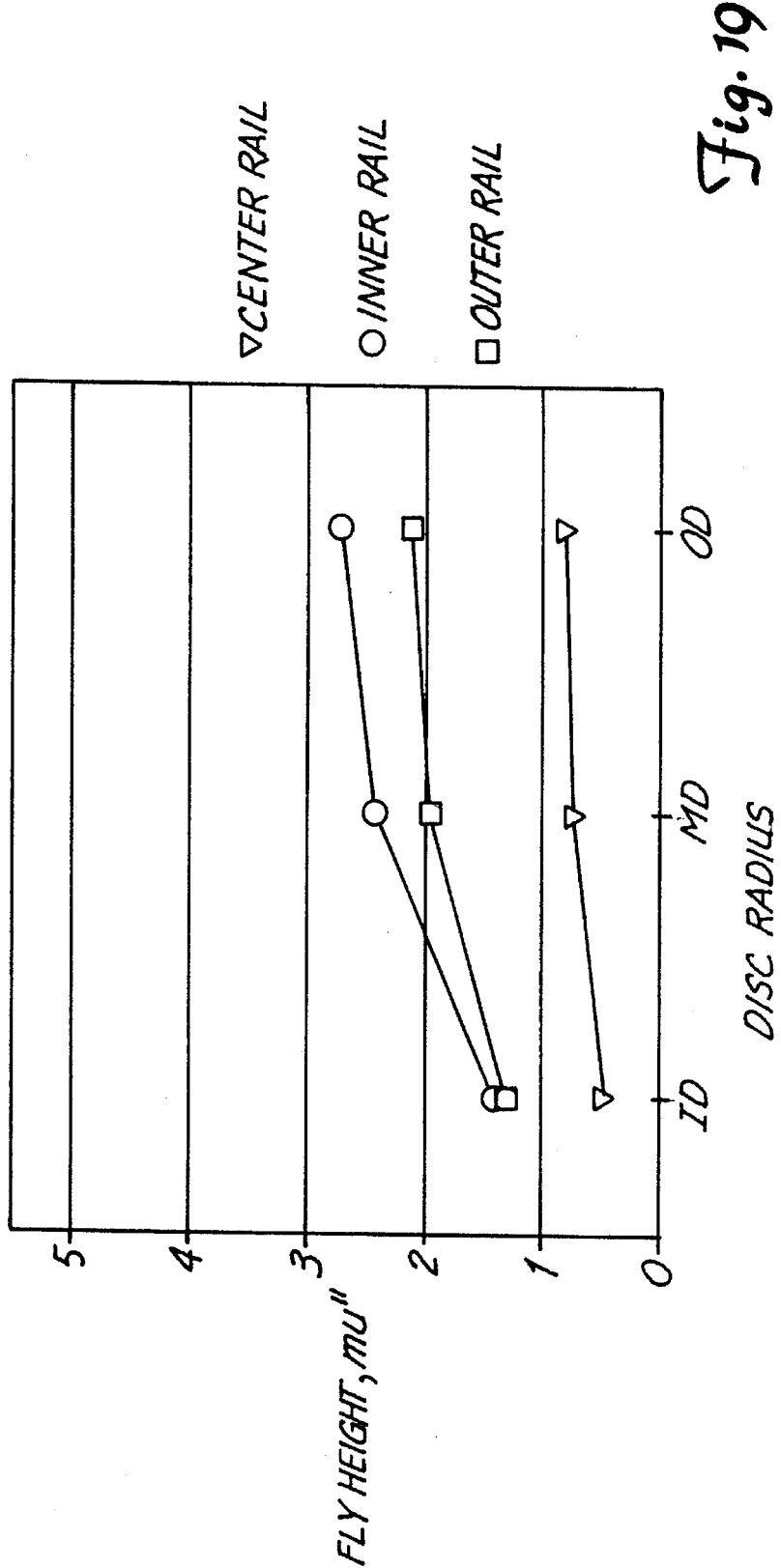
FIG. 19 is a graph of fly height versus disc radius for a slider.

FIG. 18 shows that OD roll of a slider with 5 micron cavity etch depth is well controlled by a rail shape with large waist offset. A typical slider 70 with high waist offset is shown in FIG. 8. The flying height of the recording head and the outriggers in an example 2.5 inch drive is shown in FIG. 19. Comparison of FIG. 19 with FIG. 11 shows that the high waist offset design of slider 70 in FIG. 8 reduced the OD roll from that of zero waist offset design slider 74 of FIG. 10. The high waist offset slider then has reduced probability of disc contact with the outer rail at the drive OD.

Figure 20:
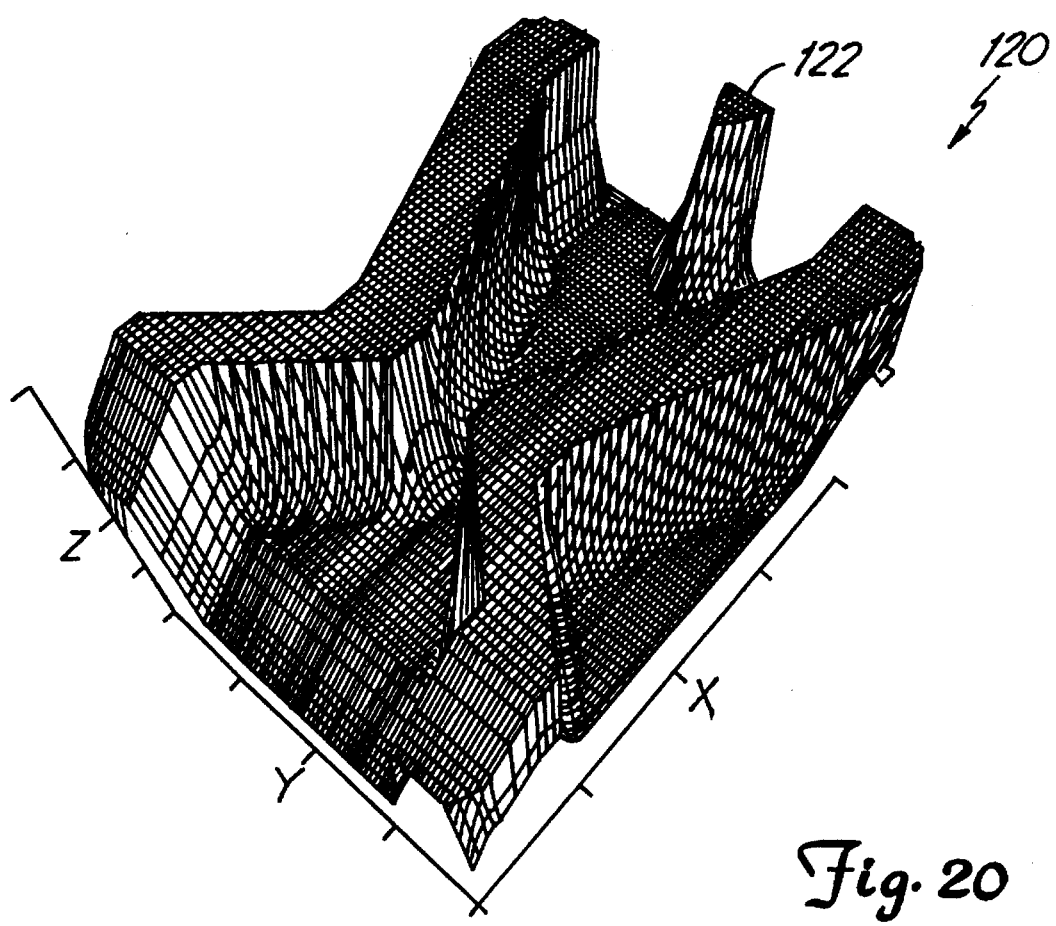
FIG. 20 is a graphical representation of a slider with a center pad in accordance with one embodiment of the invention.
Figure 21:
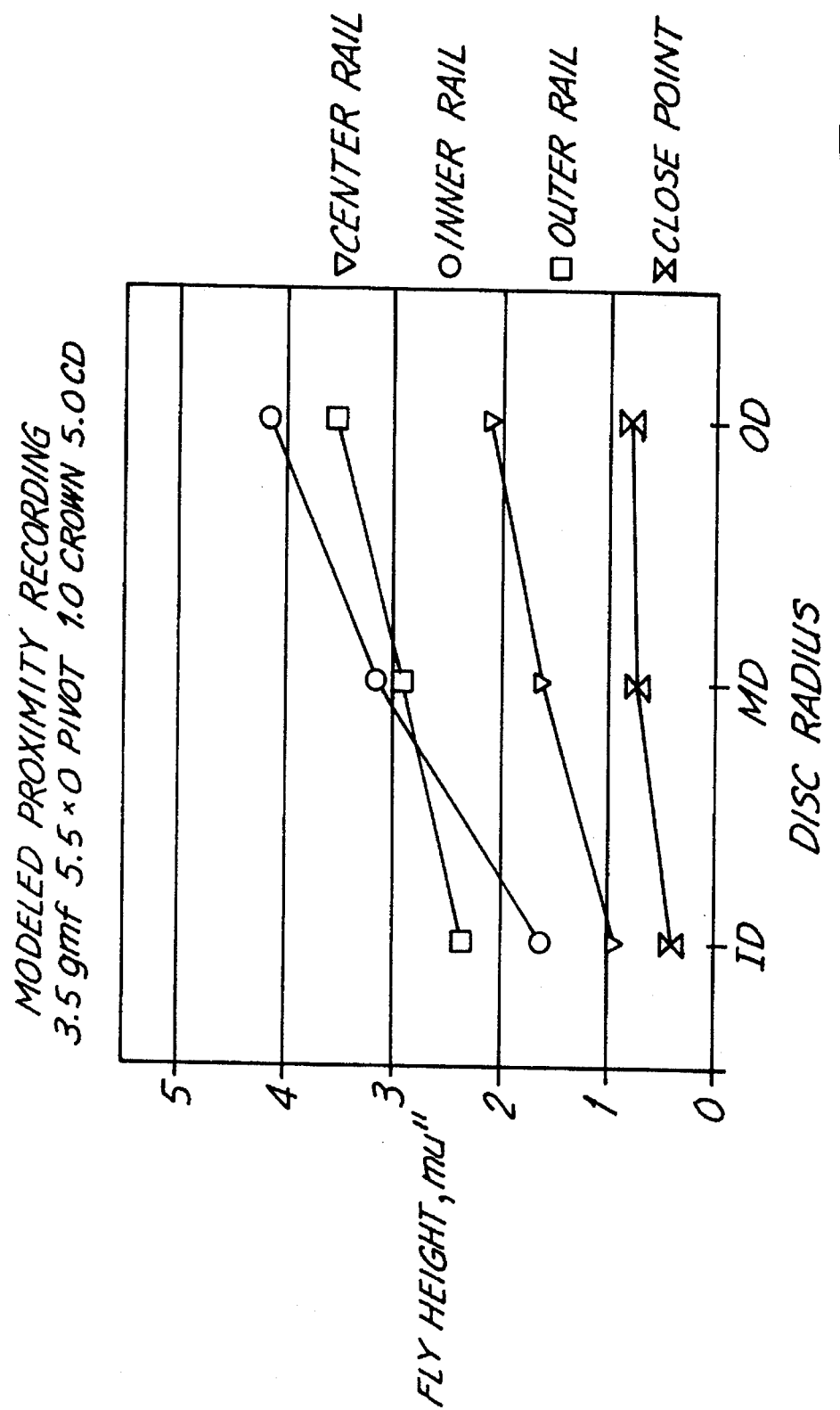
FIG. 21 is a graph of fly height versus disc radius for a slider.

Slider 120 for a PRAB design for a 3.5 inch drive is shown in FIG. 20. Slider 120 has a center rail head mount 122 and an hourglass ratio of 1.0. The flying height is shown in FIG. 21. The 3.5 inch drive has a skew angle range from −7.9 degrees at the ID to 15.3 degrees at the OD. The relatively small OD skew does not counteract the high OD disc sliding velocity. Therefore, the fly height rises steeply from the ID to the OD.

A PRAB design slider 72 with side rail head mounting and hourglass ratio of 1.0 is shown in FIG. 9. The preload application point is shifted toward the outer rail on a side rail head mounted design. This load point shift rolls the inner rail away from the disc surface, reducing the probability of asperity contact with the inner rail. Thus, the inner rail on a side rail head mounted PRAB design flies higher than the head, similarly to the outriggers on a center rail head mounted PRAB design. In the center rail case, the outriggers are raised above the head by the pitch angle. In the side rail case, the inner rail is raised above the head by the roll angle.

Figure 22:
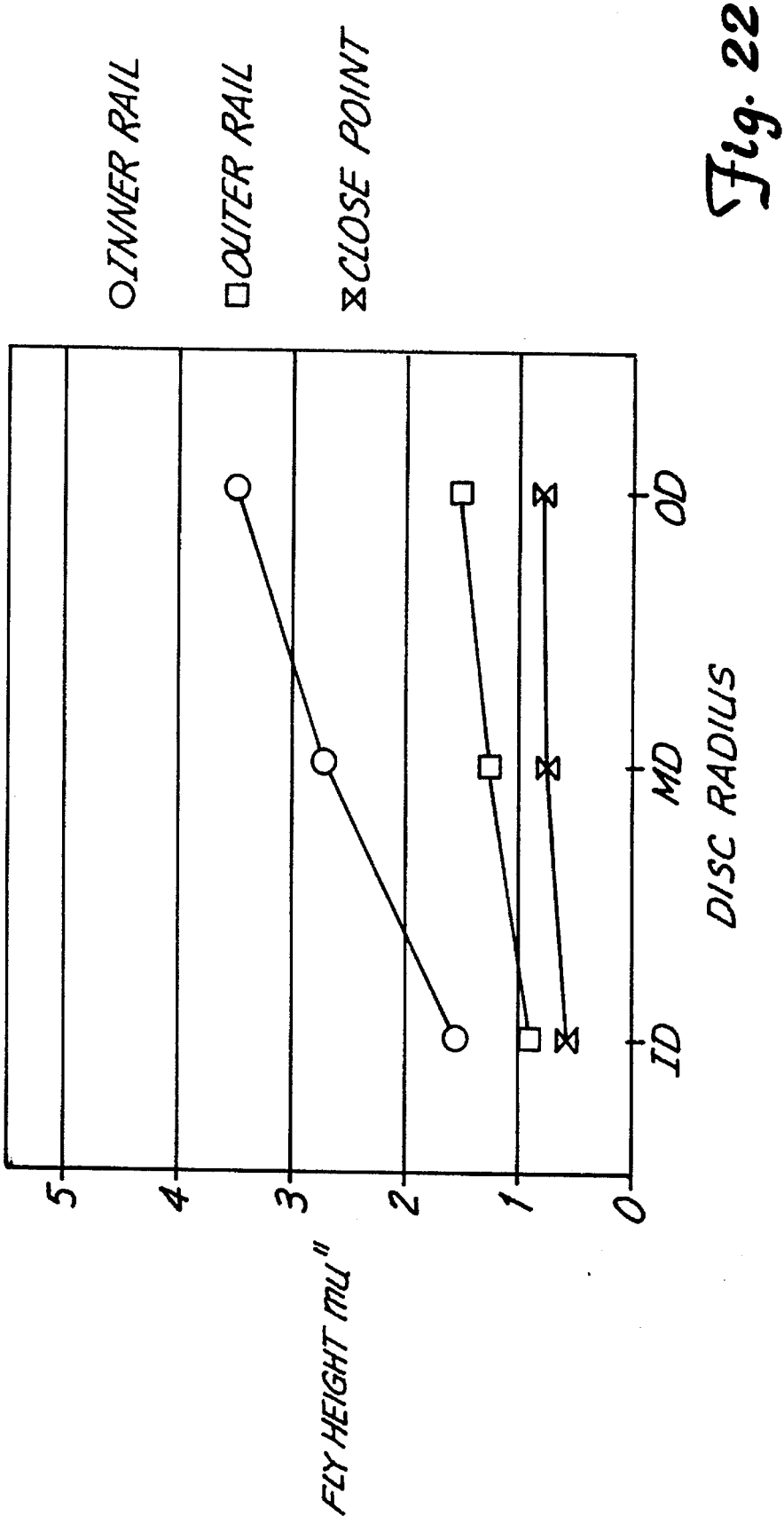
FIG. 22 is a graph of a fly height versus disc radius.

The flying height of the PRAB design slider 72 of FIG. 9 is shown in FIG. 22. The fly height rise from ID to OD is reduced from the center rail PRAB design of FIGS. 20–21. This is because slider 72 rolls the head toward disc 14 more at the disc OD than at the ID. The nearly constant head flying height from ID to OD gives better recording performance from the side rail design than from the center rail design with a steep rise in head flying height from ID to OD. This is another advantage of side rail head mounting over center rail head mounting, in addition to the storage capacity increase listed in Table 1.

Disc file air bearing sliders usually have crowned air bearing surfaces to prevent water film condensate from collecting between the slider and the disc when the disc is at rest. Such condensate tends to stick the slider to the disc by surface tension. A crowned slider collects less condensate over a smaller area of contact than a flat slider. Therefore, the disc is easier to put spinning from rest under a crowned slider, since there is less surface tension to overcome than under a flat slider with a large area of water film collected.

Figure 23A:
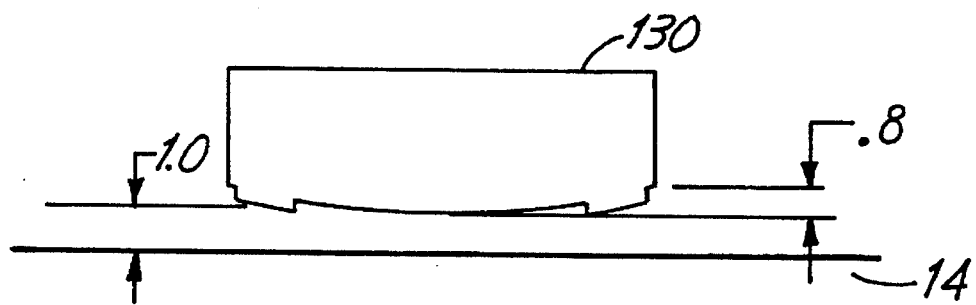
FIGS. 23A and 23B show the effects of roll on a slider having crowned rails.
Figure 23B:
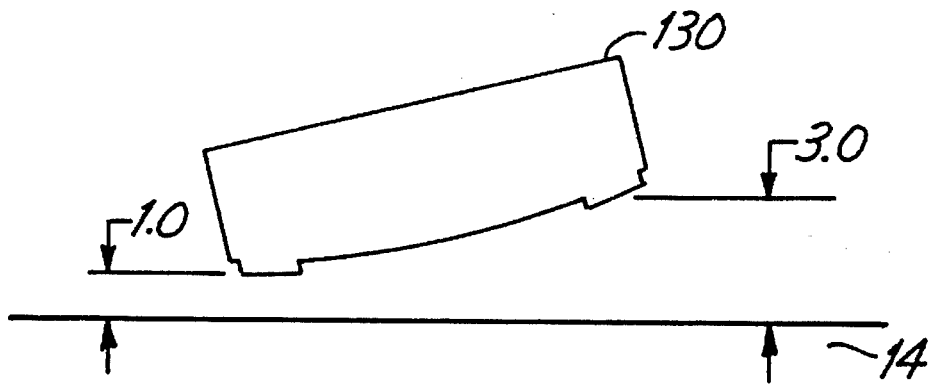

The crowned slider is usually formed on a spherical lapping plate, thus there is also some cross-curvature formed on typical sliders. A typical value of cross-curvature is a 0.8 micro inch convexity height. FIGS. 23a and 23b show the trailing edge view of a side rail head mounted slider 130 with 0.8 micro inch convex cross-curvature at various slider roll angles. The slider with zero roll has the inner edges of the rails protruding towards disc 14. The slider with 40 micro-radians roll has the outer rail trailing edge nearly parallel with the disc surface. FIGS. 23a and 23b demonstrate that there is less propensity for the rail edges to dig into the disc surface at large roll angles than at small roll angles. Thus the large roll angle of the side rail head mounted PRAB design does not present a reliability risk from the slider edges digging into the disc surface.

Typical slider dimensions are as follows:

TABLE 2

| Feature | Dimension |
| --- | --- |
| Leading edge width | 2.0–20 mils. |
| Waist section width | 2.0–20 mils. |
| Trailing edge width | 5.0–20 mils. |
| Rail length | 10–80 mils. |
| Slider width | 10–63 mils. |
| Slider length | 10–80 mils. |
| Waist offset | 0.0–28 mils |

Although the present invention has been described with reference to preferred embodiments, workers skilled in the art will recognize that changes may be made in form and detail without departing from the spirit and scope of the invention.

What is claimed is:

1. An air bearing disc head slider for supporting a transducing head proximate a rotating magnetic disc, comprising:
    a slider body having a surface with a leading edge, a trailing edge, first and second side edges and a longitudinal center axis;
    first and second raised side rails along the first and second edges, respectively, each having a leading section, a trailing section, a waist section therebetween, an inner edge and an outer edge, wherein a ratio of a trailing section width to a waist section width is at least about 1.0; and
    wherein the waist sections are offset toward the longitudinal center axis such that the waist sections have a convex shape along the inner edges.

2. The air bearing disc head slider of claim 1 including:
    a central pad positioned between the first and second rails; and
    wherein the central pad carries the transducing head.

3. The air bearing disc head slider of claim 1 wherein one of the first and second rails is an outer rail and the transducing head is mounted on the outer rail at the trailing edge.

4. The air bearing disc head slider of claim 1 wherein the rails are generally narrow relative to a width of the transducing head and the rails flare out toward the trailing edge providing sufficient space to mount the transducing head.

5. The air bearing head slider of claim 1 including a cavity between the first and second rails and the cavity has a depth of less than about 5 microns.

6. The air bearing disc head slider of claim 1 wherein the side rails are crowned.

7. The air bearing disc head slider of claim 1 wherein widths of the leading sections are between about 2.0 and 20 mils, widths of the waist sections are between about 2.0 and 20 mils, and widths of the trailing sections are between about 5.0 and 20 mils.

8. The air bearing disc head slider of claim 1 wherein the rails have lengths of between about 10 and about 80 mils.

9. The air bearing disc head slider of claim 1 wherein:
    the outer edge of the first and second raised side rails has an outermost portion along the leading section and an outermost portion along the trailing section with respect to the longitudinal center axis; and
    the waist section is offset along the outer edge from a straight line extending between the outermost portions of the leading and trailing sections a distance which is between about 0.0 and 28 mils.

10. An air bearing disc head slider for supporting a transducing head proximate a rotating magnetic disc, comprising:
    a slider body having a leading edge, a trailing edge and a longitudinal center axis;
    two raised side rails extending between the leading edge and the trailing edge, each having an inner edge, an outer edge, a leading section, a trailing section and a waist section therebetween; and
    wherein the outer edge of each waist section is offset toward the longitudinal center axis from a straight line extending between an outermost edge of the leading edge section and an outermost edge of the trailing section a distance which is greater than 0.0 mils and less than 28 mils such that the two raised side rails have convex shapes generally along the inner edge of the waist sections.

11. The air bearing disc head slider of claim 10 wherein the two rails have hourglass ratios of greater than 1.0.

12. The air bearing disc head slider of claim 10 including:
    a central pad positioned between the two raised side rails; and
    wherein the central pad carries the transducing head.

13. The air bearing disc head slider of claim 10 including a transducing head mounted on the trailing edge of one of the two raised side rails.

14. The air bearing disc head slider of claim 10 wherein the rails are generally narrow relative to a width of the transducing head and the rails flare out toward the trailing edge providing sufficient space to mount the transducing head.

15. The air bearing head slider of claim 10 including a cavity between the two raised side rails having a depth of less than about 5.0 microns.

16. The air bearing disc head slider of claim 10 wherein the side rails are crowned.

17. The air bearing disc head slider of claim 10 wherein widths of the leading sections are between about 2.0 and 20 mils, widths of the waist sections are between about 2.0 and 20 mils, and widths of the trailing sections are between about 5.0 and 20 mils.

18. The air bearing disc head slider of claim 10 wherein the rails have lengths of between about 10 and about 80 mils.

19. A slider for supporting a transducing head proximate a rotating disc, comprising:

a slider body having a leading edge, a trailing edge and a longitudinal center axis;

first and second raised side rails extending between the leading edge and the trailing edge, each side rail having inner and outer edges, a leading section, a trailing section and a waist section therebetween, wherein the inner and outer edges converge at the waist section and wherein each section has a rail center between the inner and outer edges; and wherein the rail center of the waist section is offset from the rail center of the leading section at the leading edge and the rail center of the trailing section at the trailing edge in a direction toward the longitudinal center axis.

20. The slider of claim 19 wherein:

the outer edge of the first and second raised side rails has an outermost portion along the leading section and an outermost portion along the trailing section; and each waist section is offset along the outer edge from a straight line extending between the outermost portions of the leading and trailing sections a distance which is greater than 0.0 mils and less than 28 mils.

21. The slider of claim 19 wherein the first and second raised side rails have convex shapes generally along the inner edge of the waist sections.

* * * * *